US012647492B1

(12) United States Patent
Borgnino et al.

(10) Patent No.: US 12,647,492 B1
(45) Date of Patent: Jun. 2, 2026

(54) AUTOMATICALLY MODERATING CONTENT OF MEDIA PROGRAMS USING MULTI-TIERED MACHINE LEARNING SOLUTIONS

(71) Applicant: Amazon Technologies, Inc., Seattle, WA (US)

(72) Inventors: Juan Martin Borgnino, Marina Del Rey, CA (US); Sanjeev Kumar, Redmond, WA (US); Shenshen Liang, Menlo Park, CA (US); Ayman Mahfouz, Culver City, CA (US); Robert Eicher Simmering, Santa Ana, CA (US); Harshal Dilip Wanjari, Issaquah, WA (US); Muhammad Yahia, Anaheim, CA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 17/490,934

(22) Filed: Sep. 30, 2021

(51) Int. Cl.
H04L 67/50 (2022.01)
G10L 15/16 (2006.01)
(Continued)

(52) U.S. Cl.
CPC ............ H04L 67/535 (2022.05); G10L 15/16 (2013.01); H04H 60/65 (2013.01); H04L 65/1083 (2013.01)

(58) Field of Classification Search
CPC ................................ H04L 65/75; G10L 15/16
See application file for complete search history.

(56) References Cited

U.S. PATENT DOCUMENTS

| | | | |
|---|---|---|---|
| 8,023,800 | B2 | 9/2011 | Concotelli |
| 8,112,720 | B2 | 2/2012 | Curtis |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

(Continued)

*Primary Examiner* — Nicholas P Celani
(74) *Attorney, Agent, or Firm* — Athorus, PLLC

(57) ABSTRACT

As a media program is aired to listeners, a control system monitors audio data transmitted to the listeners and interactions received from the listeners to determine whether the media program has violated or may violate one or more rules. The audio data is processed to identify words expressed therein and features of the audio data. Additionally, features of users (e.g., a creator or any listeners or guests) may be calculated based on any information or data available regarding such users. An embedding is formed with data representing the words, the audio features and the user features, and provided to a model trained to determine whether a media program is at risk of violating any rules. One or more actions are selected and executed or recommended based on a score generated by the model representing a level of risk that a rule has been, is being or will be violated.

20 Claims, 26 Drawing Sheets

(51) Int. Cl.
    *H04H 60/65*     (2008.01)
    *H04L 65/1083*     (2022.01)

(56)       References Cited

U.S. PATENT DOCUMENTS

| | | | |
|---|---|---|---|
| 8,560,683 | B2 | 10/2013 | Funk et al. |
| 8,572,243 | B2 | 10/2013 | Funk et al. |
| 8,768,782 | B1 | 7/2014 | Myslinski |
| 8,850,301 | B1 | 9/2014 | Rose |
| 9,003,032 | B2 | 4/2015 | Funk et al. |
| 9,369,740 | B1 | 6/2016 | Funk et al. |
| 9,613,636 | B2 | 4/2017 | Gibbon et al. |
| 9,706,253 | B1 | 7/2017 | Funk et al. |
| 9,729,596 | B2 | 8/2017 | Sanghavi et al. |
| 9,781,491 | B2 | 10/2017 | Wilson |
| 9,872,069 | B1 | 1/2018 | Funk et al. |
| 10,083,169 | B1 * | 9/2018 | Ghosh ............... G06N 3/084 |
| 10,091,547 | B2 | 10/2018 | Sheppard et al. |
| 10,110,952 | B1 | 10/2018 | Gupta et al. |
| 10,135,887 | B1 | 11/2018 | Esser et al. |
| 10,140,364 | B1 | 11/2018 | Diamondstein |
| 10,178,422 | B1 | 1/2019 | Panchaksharaiah et al. |
| 10,178,442 | B2 | 1/2019 | Shkedi |
| 10,313,726 | B2 | 6/2019 | Woods et al. |
| 10,356,476 | B2 | 7/2019 | Dharmaji |
| 10,432,335 | B2 | 10/2019 | Bretherton |
| 10,489,395 | B2 | 11/2019 | Akkur et al. |
| 10,685,050 | B2 | 6/2020 | Krishna et al. |
| 10,698,906 | B2 | 6/2020 | Hargreaves et al. |
| 10,719,837 | B2 | 7/2020 | Kolowich et al. |
| 10,769,678 | B2 | 9/2020 | Li |
| 10,846,330 | B2 | 11/2020 | Shilo |
| 10,893,329 | B1 | 1/2021 | Trim et al. |
| 10,985,853 | B2 | 4/2021 | Bretherton |
| 10,986,064 | B2 | 4/2021 | Siegel et al. |
| 10,997,240 | B1 | 5/2021 | Aschner et al. |
| 11,431,660 | B1 | 8/2022 | Leeds et al. |
| 11,451,863 | B1 | 9/2022 | Benjamin et al. |
| 11,463,772 | B1 | 10/2022 | Wanjari et al. |
| 11,521,179 | B1 | 12/2022 | Shetty |
| 11,580,982 | B1 | 2/2023 | Karnawat et al. |
| 11,586,344 | B1 | 2/2023 | Balagurunathan et al. |
| 2002/0042920 | A1 | 4/2002 | Thomas et al. |
| 2002/0056087 | A1 | 5/2002 | Berezowski et al. |
| 2006/0268667 | A1 | 11/2006 | Jellison et al. |
| 2007/0124756 | A1 | 5/2007 | Covell et al. |
| 2007/0271518 | A1 | 11/2007 | Tischer et al. |
| 2007/0271580 | A1 | 11/2007 | Tischer et al. |
| 2008/0086742 | A1 | 4/2008 | Aldrey et al. |
| 2009/0044217 | A1 | 2/2009 | Lutterbach et al. |
| 2009/0076917 | A1 | 3/2009 | Jablokov et al. |
| 2009/0100098 | A1 | 4/2009 | Feher et al. |
| 2009/0254934 | A1 | 10/2009 | Grammens |
| 2010/0088187 | A1 | 4/2010 | Courtney et al. |
| 2010/0280641 | A1 | 11/2010 | Harkness et al. |
| 2011/0063406 | A1 | 3/2011 | Albert et al. |
| 2011/0067044 | A1 | 3/2011 | Albo |
| 2012/0040604 | A1 | 2/2012 | Amidon et al. |
| 2012/0191774 | A1 | 7/2012 | Bhaskaran et al. |
| 2012/0304206 | A1 | 11/2012 | Roberts et al. |
| 2012/0311444 | A1 | 12/2012 | Chaudhri |
| 2012/0311618 | A1 | 12/2012 | Blaxland |
| 2012/0331168 | A1 | 12/2012 | Chen |
| 2013/0074109 | A1 | 3/2013 | Skelton et al. |
| 2013/0247081 | A1 | 9/2013 | Vinson et al. |
| 2013/0253934 | A1 | 9/2013 | Parekh et al. |
| 2014/0019225 | A1 | 1/2014 | Guminy et al. |
| 2014/0040494 | A1 | 2/2014 | Deinhard et al. |
| 2014/0068432 | A1 | 3/2014 | Kucharz et al. |
| 2014/0073236 | A1 | 3/2014 | Iyer |
| 2014/0108531 | A1 | 4/2014 | Klau |
| 2014/0123191 | A1 | 5/2014 | Hahn et al. |
| 2014/0228010 | A1 | 8/2014 | Barbulescu et al. |
| 2014/0325557 | A1 | 10/2014 | Evans et al. |
| 2014/0372179 | A1 | 12/2014 | Ju et al. |
| 2015/0095014 | A1 | 4/2015 | Marimuthu |
| 2015/0163184 | A1 | 6/2015 | Kanter et al. |
| 2015/0242068 | A1 * | 8/2015 | Losey .............. H04N 21/44226 |
| | | | 715/716 |
| 2015/0248798 | A1 | 9/2015 | Howe et al. |
| 2015/0289021 | A1 | 10/2015 | Miles |
| 2015/0319472 | A1 | 11/2015 | Kotecha et al. |
| 2015/0326922 | A1 | 11/2015 | Givon et al. |
| 2016/0027196 | A1 | 1/2016 | Schiffer et al. |
| 2016/0093289 | A1 | 3/2016 | Pollet |
| 2016/0188728 | A1 | 6/2016 | Gill et al. |
| 2016/0217488 | A1 | 7/2016 | Ward et al. |
| 2016/0266781 | A1 | 9/2016 | Dandu et al. |
| 2016/0293036 | A1 | 10/2016 | Niemi et al. |
| 2016/0330529 | A1 | 11/2016 | Byers |
| 2017/0127136 | A1 | 5/2017 | Roberts et al. |
| 2017/0164357 | A1 | 6/2017 | Fan et al. |
| 2017/0193531 | A1 | 7/2017 | Fatourechi et al. |
| 2017/0213248 | A1 | 7/2017 | Jing et al. |
| 2017/0289617 | A1 | 10/2017 | Song et al. |
| 2017/0329466 | A1 | 11/2017 | Krenkler et al. |
| 2017/0366854 | A1 | 12/2017 | Puntambekar et al. |
| 2018/0025078 | A1 | 1/2018 | Quennesson |
| 2018/0035142 | A1 | 2/2018 | Rao et al. |
| 2018/0205797 | A1 | 7/2018 | Faulkner |
| 2018/0227632 | A1 | 8/2018 | Rubin et al. |
| 2018/0255114 | A1 | 9/2018 | Dharmaji |
| 2018/0293221 | A1 | 10/2018 | Finkelstein et al. |
| 2018/0322411 | A1 | 11/2018 | Wang et al. |
| 2018/0367229 | A1 | 12/2018 | Gibson et al. |
| 2019/0065610 | A1 | 2/2019 | Singh |
| 2019/0132636 | A1 | 5/2019 | Gupta et al. |
| 2019/0156196 | A1 | 5/2019 | Zoldi et al. |
| 2019/0171762 | A1 | 6/2019 | Luke et al. |
| 2019/0273570 | A1 | 9/2019 | Bretherton |
| 2019/0327103 | A1 | 10/2019 | Niekrasz |
| 2019/0385600 | A1 | 12/2019 | Kim |
| 2020/0021888 | A1 * | 1/2020 | de Mello Brandao ..................... |
| | | | H04N 21/8456 |
| 2020/0106885 | A1 | 4/2020 | Koster et al. |
| 2020/0160458 | A1 | 5/2020 | Bodin et al. |
| 2020/0226418 | A1 * | 7/2020 | Dorai-Raj .............. G06N 20/00 |
| 2020/0279553 | A1 | 9/2020 | McDuff et al. |
| 2020/0364727 | A1 | 11/2020 | Scott-Green et al. |
| 2021/0090224 | A1 | 3/2021 | Zhou et al. |
| 2021/0104245 | A1 | 4/2021 | Alas et al. |
| 2021/0105149 | A1 | 4/2021 | Roedel et al. |
| 2021/0125054 | A1 | 4/2021 | Banik et al. |
| 2021/0160588 | A1 | 5/2021 | Joseph et al. |
| 2021/0210102 | A1 | 7/2021 | Huh et al. |
| 2021/0217413 | A1 | 7/2021 | Tushinskiy et al. |
| 2021/0232577 | A1 | 7/2021 | Ogawa et al. |
| 2021/0256086 | A1 | 8/2021 | Askarian et al. |
| 2021/0281925 | A1 | 9/2021 | Shaikh et al. |
| 2021/0366462 | A1 | 11/2021 | Yang et al. |
| 2021/0407520 | A1 | 12/2021 | Neckermann et al. |
| 2022/0038783 | A1 | 2/2022 | Wee |
| 2022/0038790 | A1 | 2/2022 | Duan et al. |
| 2022/0159377 | A1 | 5/2022 | Wilberding et al. |
| 2022/0223286 | A1 | 7/2022 | Lach et al. |
| 2022/0230632 | A1 | 7/2022 | Maitra et al. |
| 2022/0254348 | A1 | 8/2022 | Tay et al. |
| 2022/0286748 | A1 | 9/2022 | Dyer et al. |
| 2022/0369034 | A1 | 11/2022 | Kumar et al. |
| 2023/0036192 | A1 | 2/2023 | Alakoye |
| 2023/0085683 | A1 | 3/2023 | Turner |
| 2023/0217195 | A1 | 7/2023 | Poltorak |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Stack Overflow, "Audio mixing of Spotify tracks in IOS app," stackoverflow.com, Stack Overflow Network, Jul. 2012, available at

(56) References Cited

OTHER PUBLICATIONS

URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

* cited by examiner

CALCULATE INITIAL SCORE REPRESENTING RISK OF RULE VIOLATIONS

CALCULATE SCORE REPRESENTING RISK OF RULE
VIOLATIONS DURING MEDIA PROGRAM

UPDATE SCORE REPRESENTING RISK OF RULE VIOLATIONS
OF MEDIA PROGRAM

MODEL DETERMINES RISK OF VIOLATION BASED ON EMBEDDING

TRAIN MODEL TO RECOGNIZE RISK OF VIOLATION USING TRAINING EMBEDDINGS

AUTOMATICALLY MODERATING CONTENT OF MEDIA PROGRAMS USING MULTI-TIERED MACHINE LEARNING SOLUTIONS

BACKGROUND

Traditionally, media programs that are broadcast via radio stations or transmitted via other platforms are subject to content-based restrictions. For example, one or more limits or other constraints on language that may be used by participants in a media program (e.g., prohibitions on profanity or other objectionable content), topics that may be discussed during the media program (e.g., bans on content of a violent nature), or assertions of fact that lack substantive support or are generally recognized as inaccurate. Some of the restrictions may be defined by one or more relevant laws, policies, regulations, rules or other requirements, while other restrictions may be established by owners or operators of the radio stations or platforms from which the media programs are broadcast or transmitted. For example, where a label or rating is assigned to a media program according to an established content-based standard, a creator or participants in the media program are obligated to broadcast or transmit content that falls within the bounds of limits associated with the label or rating.

While content-based restrictions on media programs may be enforced after the fact, or in a forensic manner, by one or more government or regulatory bodies, many radio stations or other platforms employ a number of personnel or implement one or more operating rules to ensure that media programs comply with such restrictions as the media programs are broadcasting content, e.g., in near-real time. Many media programs are broadcast in a deferred live manner, or following a brief delay in time, such as seven seconds, to enable personnel or systems to pause a transmission of media content, or otherwise block the media content from being transmitted, if the media content would violate one or more in-place restrictions or other standards. For example, many sources of media programs (e.g., radio stations or other platforms) have made substantial investments in physical infrastructure and human talent, and employ dozens of personnel such as maintenance engineers, producers, production directors, sound engineers or station managers, to ensure that media content broadcast or otherwise transmitted by such sources comply with relevant laws, policies, regulations, rules and other requirements.

Existing systems for enforcing content-based restrictions on a media program are not fool-proof. Moreover, challenges associated with moderating content or enforcing content-based restrictions are exacerbated when multiple media programs are broadcast or transmitted simultaneously and in parallel.

BRIEF DESCRIPTION OF THE DRAWINGS

FIGS. 1A through 1L are views of aspects of one system for moderating content in accordance with embodiments of the present disclosure.

DETAILED DESCRIPTION

Figure 1A:
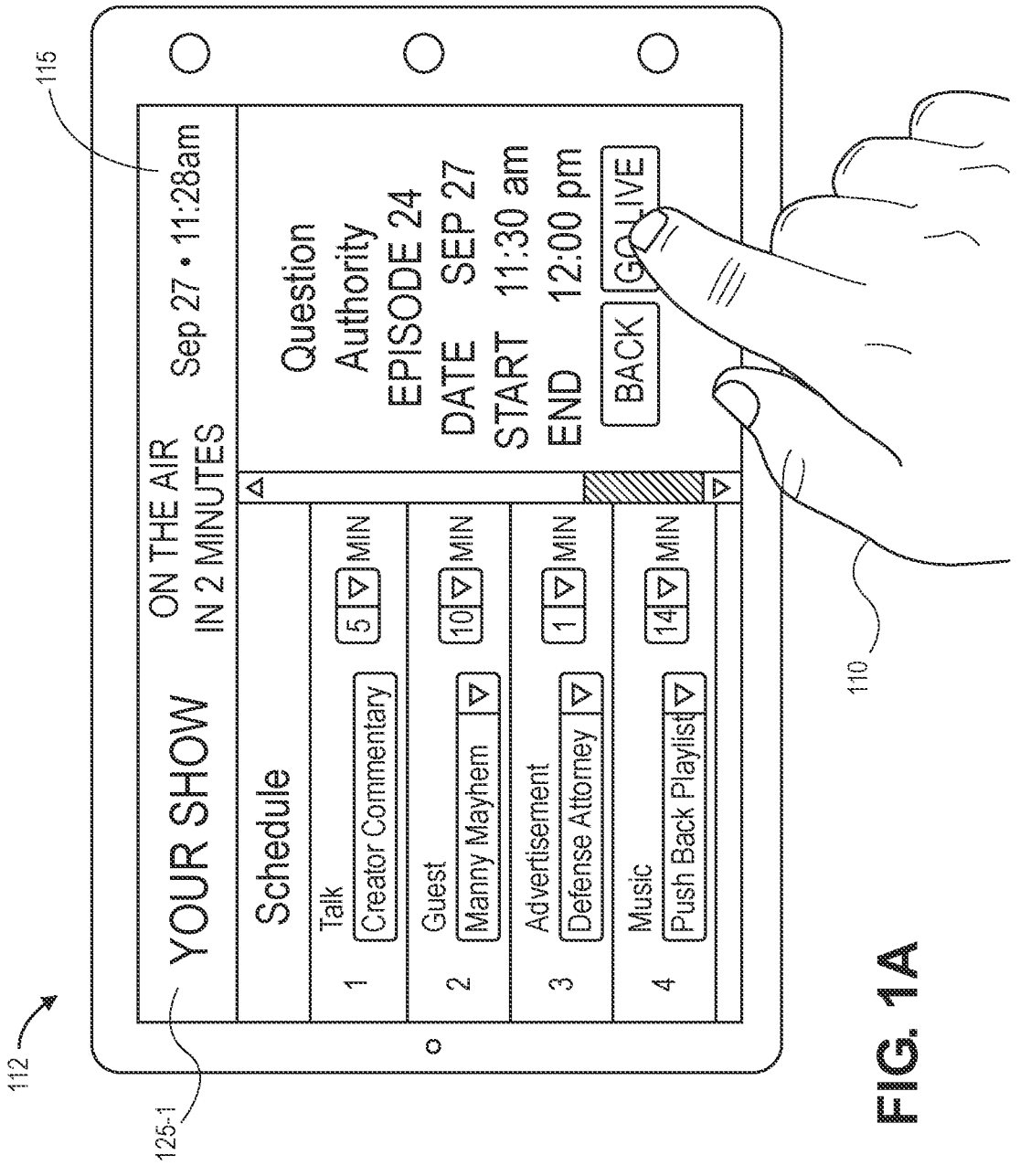

As is set forth in greater detail below, the present disclosure is directed to systems and methods for automatically moderating content of media programs, for example, to ensure that the media programs provide creators and listeners with safe and consistent experiences by automatically predicting when a media program or creators, guests, listeners or other participants may violate one or more rules (or laws, policies, regulations, or other requirements). More specifically, in some implementations, systems and methods of the present disclosure rely on machine learning models (e.g., algorithms, systems or techniques) that are applied or utilized in multiple layers or tiers, and act as a pipeline of modeling features or approaches, to determine whether a violation of one or more rules has occurred during a media program, or whether the media program is at risk of such a violation. The rules for which media content may be moderated may include, but need not be limited to, restrictions on types or categories of content, or specific content (e.g., profanity, pornography, incitements to violence, misinformation, breaches of contract or trust, or others).

The systems and methods of the present disclosure may utilize one or more machine learning models to process audio data received from users (e.g., creators, listeners or others), and to identify any text expressed within the audio data, or to identify one or more features of the audio data, e.g., audio features, such as sentiments, topics, attitudes, intentions, urgencies, emotions, or others. Information regarding users of the media program, including but not limited to histories of a creator or listeners, e.g., media programs conceived or hosted by the creator or listened to by the listeners, as well as any interactions received from such users during the media program, or whether any of such interactions include a report that one or more rules have been violated during the media program. Words represented in the audio data, as well as audio features derived from the audio data, or the features associated with users that may have been derived by one or more machine learning models, may be provided to one or more other models that are trained to determine whether a media program has violated one or more rules, or to determine a probability or a level of risk that the media program will violate one or more rules, as well as to identify a time at which a violation occurred or may have occurred, and to identify a rule that has been or may be violated, in low latency and in real time or near-real time.

In accordance with implementations of the present disclosure, one or more risk scores or other metrics representative of probabilities or levels of risk that a media program might violate one or more of the rules based on histories of the creator or the listeners, including a number or frequency of violations by the creator or any of the listeners, as well as whether numbers or frequencies of violations associated with any other media programs listened to by the listeners, may be calculated in advance of the media program.

Subsequently, data captured during the media program may be processed to update the risk score, e.g., to calculate a "live risk score," and the updated risk score may be used to determine whether a violation of one or more rules has occurred, or to determine whether a level of risk that such a violation will occur has changed, and to select and execute one or more actions for responding to the violation or the level of risk accordingly. For example, audio data received from a creator, a listener, a guest or another participant or source over an interval of time may be identified and further processed to detect any words represented therein, or to identify any features represented therein. Additionally, information or data representative of one or more interactions received from creators, listeners, participants or others may be processed to derive features regarding such users. Sets of words, audio features and/or user features may be provided as inputs to a model, and the risk score representative of a likelihood or probability that a violation of one or more rules is occurring may be updated based on outputs received from the model. For example, if a risk score is sufficiently high, e.g., in excess of thresholds associated with violations of one or more rules, then at least one of the violations may be presumed to have occurred, and one or more actions such as termination of the media program, a temporary or permanent cession of control over the media program, or a transmission of information or data of any type or form to any number of computer devices may be selected and automatically executed or recommended to a human actor accordingly. If the risk score is not in excess of any such thresholds, a level of risk that a violation has or will occur may be calculated, and one or more other actions may be selected and executed or recommended based on the level of risk accordingly. Alternatively, if the risk score is sufficiently low, then it may be determined that no actions need be taken.

In some other implementations, when an interaction is received from a user such as a creator, a listener, a guest or another participant in a media program, a context of the media program, or media content being played at a time that the interaction was received from the user may be determined. A history of the user may be identified, along with contexts or media content being played at times when other interactions were received from that user. A score may be calculated for the interaction based on the context or the media content playing at the time that the interaction was received, as well as the history of the user and the contexts or the media content of prior media programs that was played at times that the user provided such interactions. The score may be used to determine whether the interaction is trustworthy or not, and stored in association with the interaction and the user in one or more data stores.

Referring to FIGS. 1A through 1L, views of aspects of one system 100 for moderating content in accordance with embodiments of the present disclosure are shown. As is shown in FIG. 1A, a mobile device 112 (e.g., a smartphone, a tablet computer, a laptop computer, or any other system or device) of a creator 110 (e.g., a user) includes a user interface 125-1 rendered on a display 115 of the mobile device 112. In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, or any other systems (not shown). The user interface 125-1 includes information identifying the media program, viz., "Question Authority," as well as a number of an episode of the media program, and times at which the media program is scheduled to begin or end.

As is shown in FIG. 1A, the user interface 125-1 also includes one or more interactive or selectable elements or features that, when activated by the creator 110, enable the creator 110 to define one or more aspects of a media program. For example, as is shown in FIG. 1A, the user interface 125-1 includes elements or features identifying media content to be included in the media program, viz., a first set of media content including commentary by the creator 110, followed by a second set of media content including an interview by the creator 110 with a guest named "Manny Mayhem," a third set of media content including an advertisement for a defense attorney, and a fourth set of media content including a list of songs or other music entitled "Push Back Playlist." The user interface 125-1 also includes elements or features for selecting or changing one or more types or forms of media content that are to be included in the media program, as well as durations of such content, or an order of such content. The user interface 125-1 further includes one or more interactive or selectable elements or features that, when activated by the creator 110, enable the creator 110 to initiate the media program. In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form.

Figure 1B:
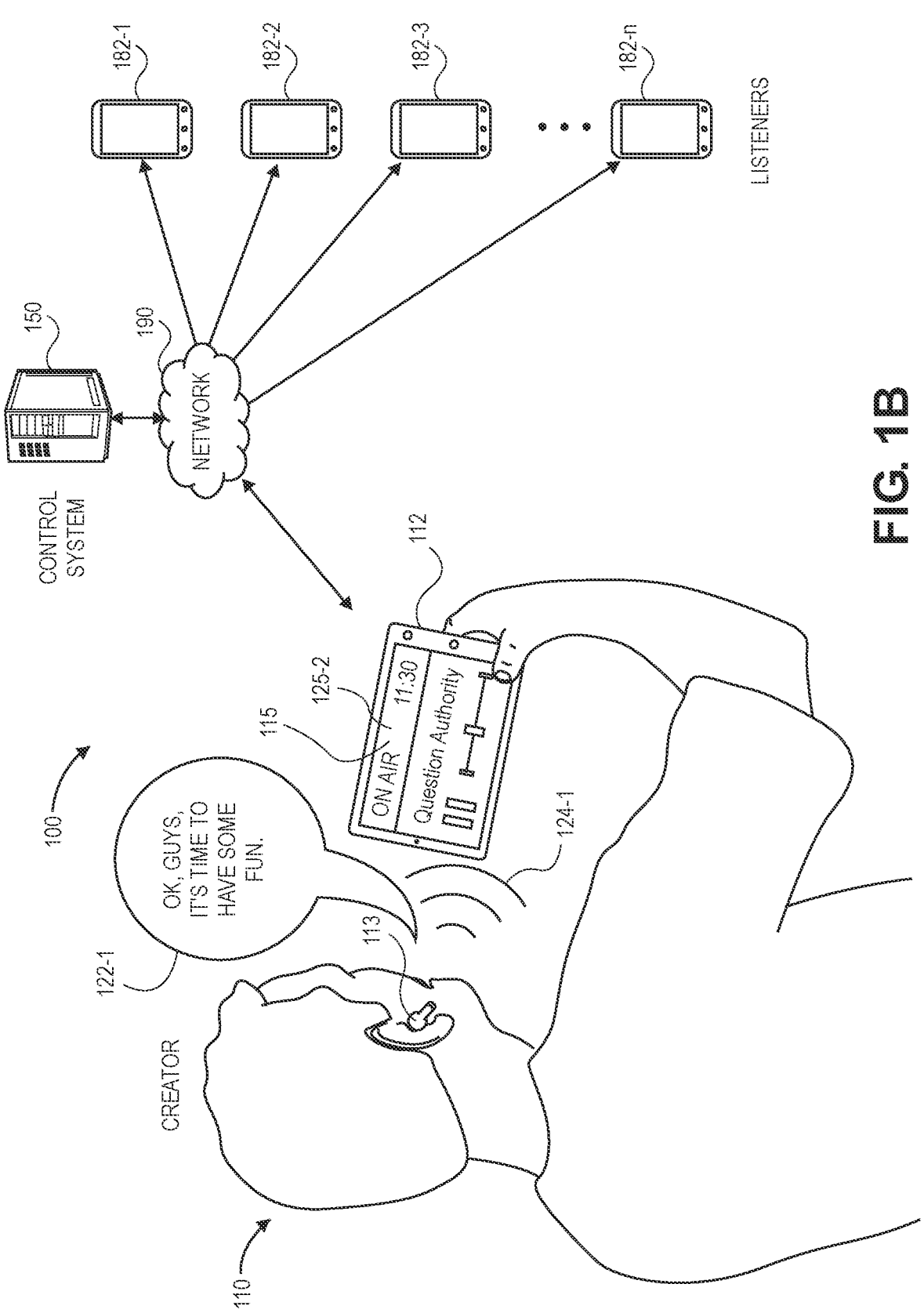

As is shown in FIG. 1B, the mobile device 112 of the creator 110 is connected to a control system 150 and a plurality of computer devices 182-1, 182-2, 182-3 . . . 182-n or other systems of any number n of listeners (or subscribers) over one or more networks 190, which may include the Internet in whole or in part. The creator 110 also wears one or more ear buds 113 (or ear phones, or head phones) or other communication systems or devices which may be in communication with the mobile device 112, and may exchange (e.g., transfer or receive) data relating to audio signals or any other data with the mobile device 112. The computer devices 182-1, 182-2, 182-3 . . . 182-n may be tablet computers, smartphones, or other mobile devices, or like systems. However, the computer systems or devices that may be operated or utilized in accordance with the present disclosure may be of any type or form, and are not limited by any of the devices or systems shown in FIG. 1A.

As is shown in FIG. 1B, the mobile device 112 includes a display 115 (e.g., a touchscreen) having a user interface 125-2 rendered thereon. The user interface 125-2 may include one or more interactive or selectable elements or features that enable the creator 110 to construct a media program from one or more sets of media content, or to control the transmission or receipt of media content in accordance with the media program, e.g., by the control system 150 or from any source, to the computer devices 182-1, 182-2, 182-3 . . . 182-n of listeners over the networks 190. In some implementations, the control system 150 may establish a two-way or bidirectional channel or connection with the mobile device 112, and one-way or unidirectional channels or connections with the devices 182-1, 182-2, 182-3 . . . 182-*n*. In some other implementations, the control system 150 may establish two-way or bidirectional channels with the mobile device 112, and any number of the devices 182-1, 182-2, 182-3 . . . 182-*n*.

As is further shown in FIG. 1B, the creator 110 provides an utterance 122-1 of one or more words that are intended to be heard by one or more listeners to the media program using the computer devices 182-1, 182-2, 182-3 . . . 182-*n*. In particular, the creator 110 states, viz., "OK, guys, now it's time to have some fun," in accordance with a broadcast plan for the media program or spontaneously. The mobile device 112 and/or the ear buds 113 may capture audio data 124-1 representing the utterance 122-1 of the creator 110, and transmit the data 124-1 to the control system 150 over the one or more networks 190. The control system 150 may then cause data, e.g., some or all of the data 124-1 to be transmitted to one or more computer systems or devices of listeners over one or more networks 190, in order to present the utterance 122-1 of the creator 110 to such listeners. The user interface 125-2 also includes one or more interactive or selectable elements or features for playing, pausing, stopping, rewinding or fast-forwarding media content to be represented in data transmitted to the respective devices 182-1, 182-2, 182-3 . . . 182-*n*, or to be played by the respective devices 182-1, 182-2, 182-3 . . . 182-*n*.

In accordance with implementations of the present disclosure, media content of a media program, including but not limited to data transmitted to devices of listeners in accordance with the media program, as well as information or data regarding histories of listeners to the media program, or any other information or data, may be moderated in real time, or in near-real time, to determine a level of risk that the media program has violated or may violate one or more rules of any type of form. Such rules may include, but need not be limited to, one or more restrictions on types or categories of content, or specific content (e.g., profanity, pornography, incitements to violence, misinformation, breaches of contract or trust, or others).

Figure 1C:
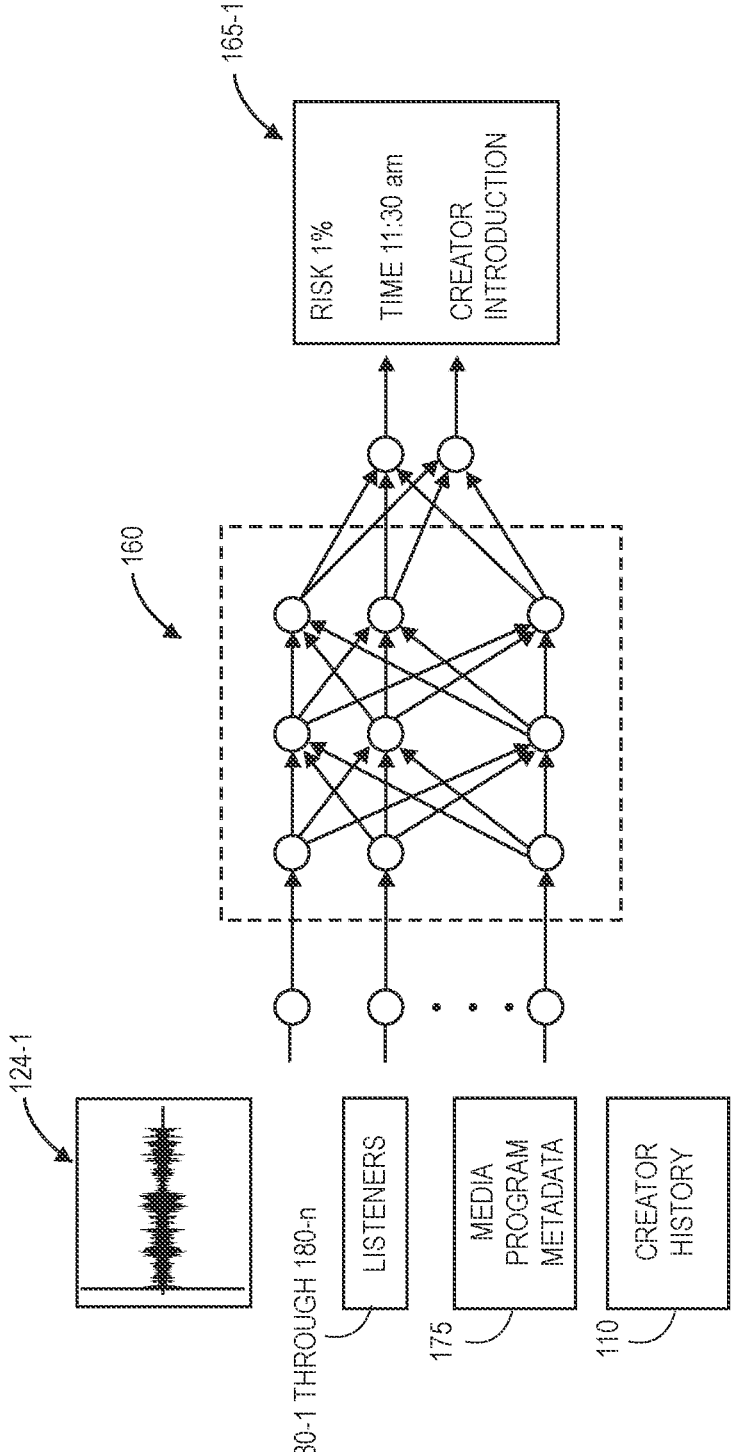

As is shown in FIG. 1C, the audio data 124-1 captured by the mobile device 112 or the ear buds 113, and information or data regarding listeners 180-1 through 180-*n* to the media program, are provided along with metadata 175 regarding the media program and information or data regarding a history of a creator 110 as one or more inputs to a model 160 trained to generate outputs 165-1 from which whether one or more rules have been violated during the media program may be determined, or to calculate a level of risk of violation of one or more rules (e.g., an initial risk score).

In some implementations, the model 160 may be an artificial neural network having an input layer, an output layer and any number of hidden layers that is trained to determine a level of risk that a media program is violating or will violate one or more rules based on words that are being spoken or sung during the media program, and features of audio data transmitted in accordance with the media program, e.g., sentiments expressed in the audio data, as well any topics, attitudes, intentions, urgencies, emotions or other features. The level of risk may also be determined based on any information regarding listeners or other participants in the media program, e.g., user features, which may include but need not be limited to interactions received from such listeners or participants during the media program, specifically whether such interactions include reports by such listeners or participants that one or more rules have been violated.

In some implementations, inputs to the model 160 may include one or more embeddings, vectors or other representations or classifications representing text or audio features determined from data transmitted to the devices of the listeners 180-1 through 180-*n*, as well as information or data regarding the listeners 180-1 through 180-*n*. The inputs to the model 160 may have been identified, determined or calculated in any manner. For example, in some implementations, the inputs to the model 160 may have been determined by providing the audio data 124-1 to one or more machine learning models to identify words or any acoustic features represented therein, and outputs from such other models may be provided as inputs to the model 160. Alternatively, or additionally, information or data regarding the listeners 180-1 through 180-*n* may be identified in and retrieved from one or more data stores, which may be associated with the control system 150 or any other systems.

Likewise, the metadata 175 regarding the media program and the history of the creator 110 may also be identified in and retrieved from one or more data stores. The metadata 175 may include, but need not be limited to, one or more text-based descriptions of the media program, any content-based ratings or classifications of such media programs, e.g., viewer ratings for maturity or other designated content, as well as any sentiments or other acoustic features that have been previously identified or extracted from media content of such programs, identifiers of any listeners to any of such media programs, images (e.g., "album cover" or "album art") associated with the media program, or any other information or data. The histories of the creator 110 may include, but need not be limited to, information or data regarding any media programs previously aired or otherwise associated with the creator 110, e.g., any text or acoustic features of such programs, or any metadata regarding such programs, as well as any ratings of such programs, feedback received from listeners to such programs, or any other information or data regarding the creator 110 or any media programs with which the creator 110 is associated. The histories of the creator 110 may also identify any history of violations of rules by the creator 110 during the media program or any other media programs, and types or extents of such violations.

Alternatively, or additionally, the inputs to the model 160 may further include one or more features (e.g., engineered features) or other information or data that need not be included in an embedding, a vector or another representation or classification. For example, one or more of such features may include information or data regarding the creator, the media program, or listeners to the media program, such as a number of listeners to the media program, a number of interactions received from such listeners (or types or categories of such interactions), a number of violations previously observed during episodes of the media program, a number of reports of violations received from listeners, or any other data, any of which may be readily transformed into numeric features and provided as inputs to the model 160.

The outputs 165-1 received from the model 160 may identify, or be used to calculate, an initial risk score, or a likelihood or probability that the media program has violated or will violate one or more rules. In some implementations, the outputs 165-1 may further include or identify, or be used to determine, a specific rule that has been violated or is at risk of violation, as well as a time or a portion of the media program during which the violation has or may occur.

Alternatively, the model 160 may be any other type or form of machine learning algorithm, system or technique. In some implementations, an initial risk score may be calculated before the media program has begun, or prior to receiving any audio data from the creator 110 or any other participants in the media program. For example, prior to the media program, the information or data regarding the listeners 180-1 through 180-$n$, the metadata 175 and the history of the creator 110 may be provided to the model 160 as inputs, and an initial risk score generally representative of a level of risk that the creator 110 or any of the listeners 180-1 through 180-$n$ may violate one or more rules during the media program may be determined based on outputs received in response to such inputs.

Figure 1D:
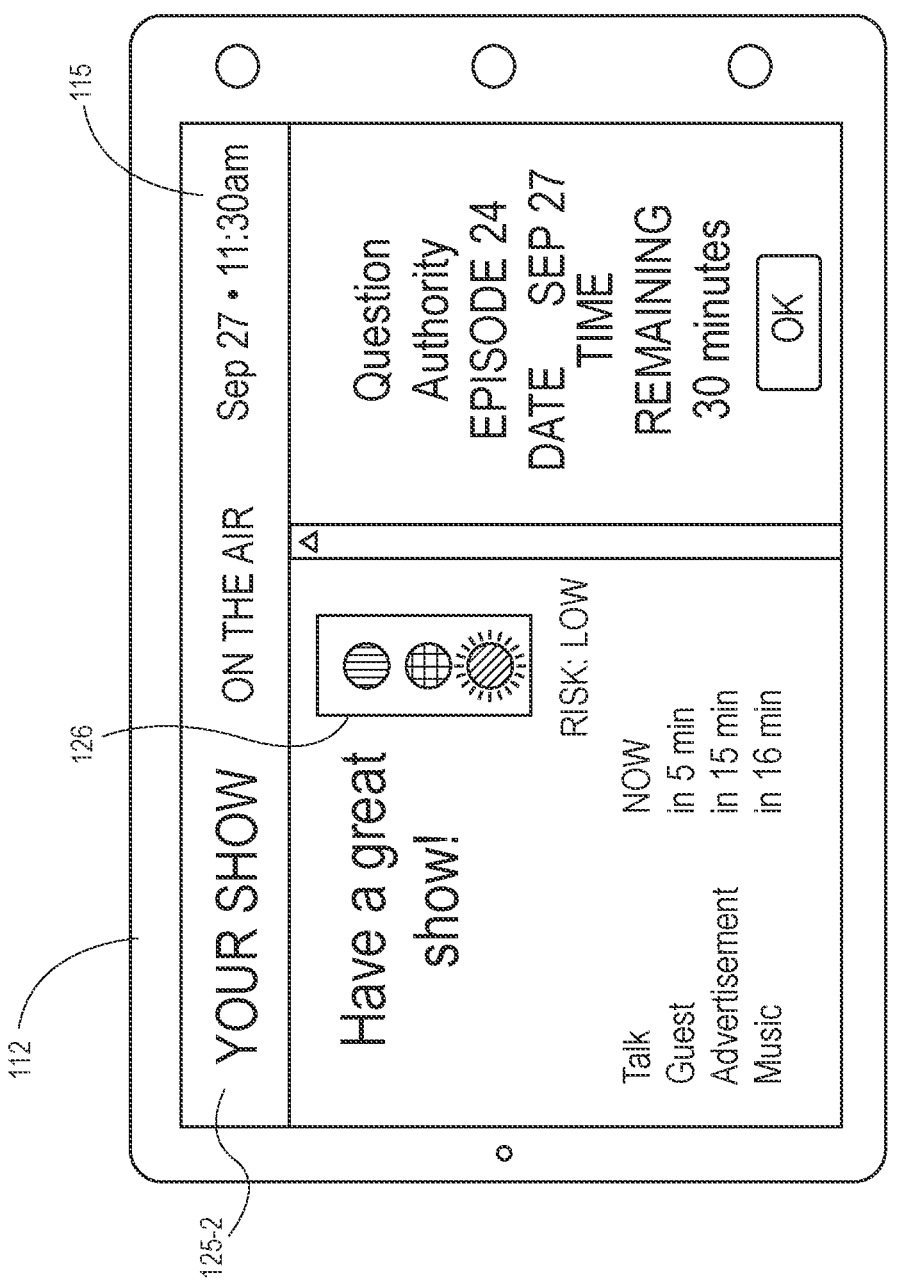

One or more actions may be identified or selected and executed or recommended, where necessary, based on a level of risk (e.g., an initial risk score) determined from the outputs 165-1. As is shown in FIG. 1D, the mobile device 112 includes a user interface 125-2 rendered on the display 115. The user interface 125-2 includes information (e.g., a set of text) including messaging to the creator 110, which may be selected based on the initial risk score calculated based on the outputs 165-1, as well as any instructions or recommendations for the creator 110 that may be identified based on such outputs 165-1. In some implementations, any remedial actions may be identified or selected and executed automatically or, in some implementations, recommended to a human associated with the control system 150 or any other entity for review. Alternatively, where an initial risk score or a level of risk so determined is sufficiently low, viz., one percent, such as is shown in FIG. 1C, no further actions may be required or desired.

As is further shown in FIG. 1D, as a substitute for or in addition to the messaging to the creator 110, the user interface 125-2 further includes a visual proxy 126 that may visually represent or approximate a risk score calculated based on the outputs 165-1. For example, as is shown in FIG. 1D, the visual proxy 126 is an image (or an icon) representing a traffic light, with a green light that is glowing or illuminated, and a set of text "RISK: LOW," which visually informs the creator 110 that the initial risk score or the level of risk associated with his or her media program remains substantially low. Alternatively, or in addition to the visual proxy 126 or the set of text, the user interface 125-2 may further include a number or another quantitative representation of the initial risk score, e.g., the outputs 165-1.

In accordance with the present disclosure, media content may be continuously moderated throughout a media program by determining text expressed in the media content, generating audio features based on the media content, or generating user features regarding a creator or one or more listeners or other participants, and providing the text, the audio features, the user features, or any other information or data to the model 160 on a regular or continuous basis. A risk score may be calculated or updated based on such information or data, or any risk scores that were previously calculated.

Figure 1E:
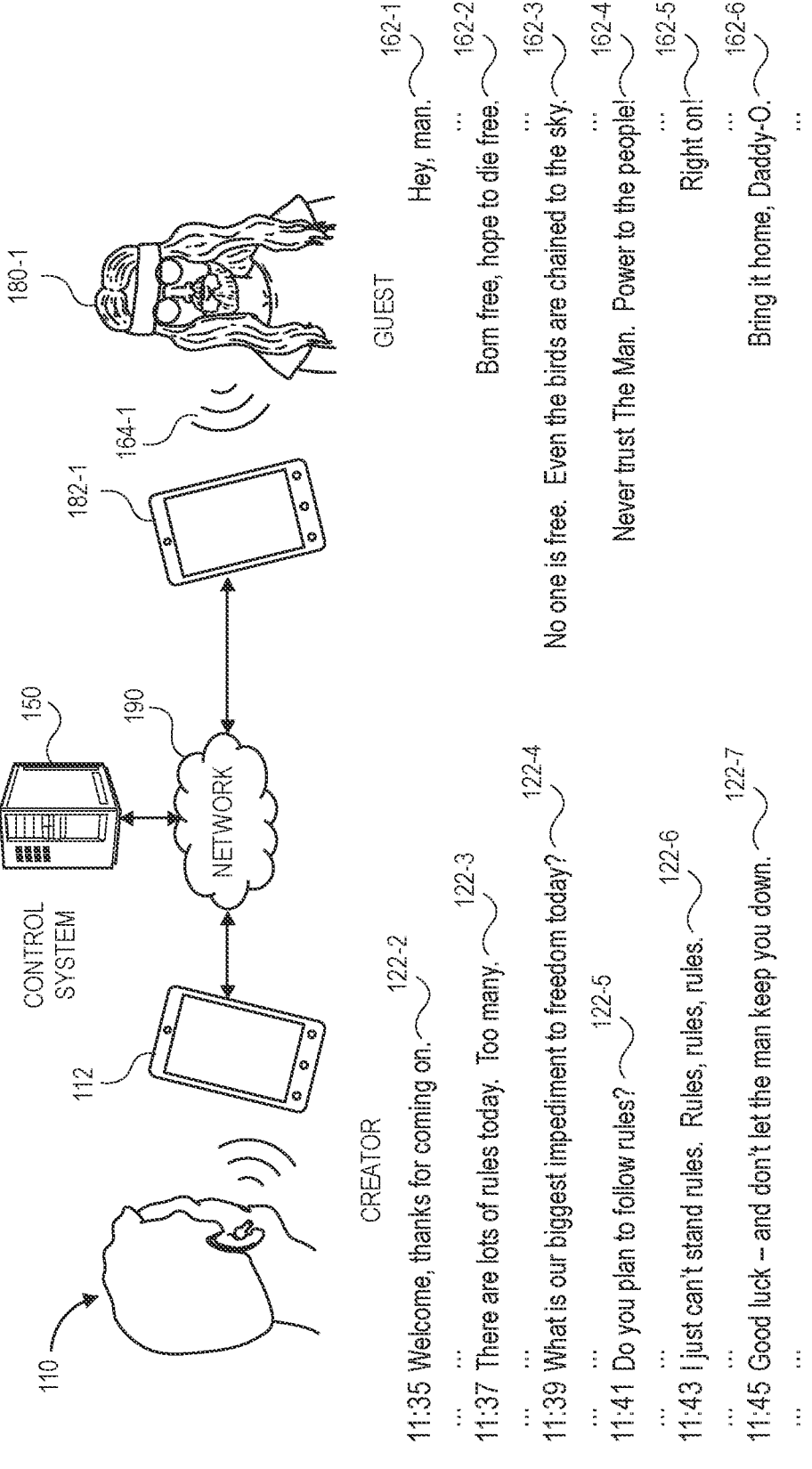

As is shown in FIG. 1E, the creator 110 engages in conversation with one of the listeners 180-1 (e.g., a guest or another participant) by way of one of the devices 182-1. The creator 110 and the listener 180-1 exchange questions, answers and other commentary via the device 112 and the device 182-1, respectively, and media content representing such commentary is transmitted to the control system 150, and subsequently to the device 112 and the devices 182-1, 182-2, 182-3 . . . 182-$n$ over the one or more networks 190. For example, as is shown in FIG. 1E, the creator 110 begins a conversation with the listener 180-1 with an utterance 122-2, viz., "Welcome, thanks for coming on," five minutes into the media program, and the listener 180-1 replies with another utterance 162-1, viz., "Hey, man." Likewise, the creator 110 provides another utterance 122-3 in the context of the media program, viz., "There are lots of rules today. Too many," two minutes later, and the listener 180-1 responds with another utterance 162-2, viz., "Born free, hope to die free." The creator 110 later asks a question with an utterance 122-4, viz., "What is our biggest impediment to freedom today?" another two minutes later, and the listener 180-1 answers with another utterance 162-3, viz., "No one is free. Even the birds are chained to the sky."

The creator 110 then responds to the answer with an utterance 122-5, viz., "Do you plan to follow rules?" two more minutes later, and the listener 180-1 responds in kind with another utterance 162-4, viz., "Never trust The Man. Power to the people!" The creator 110 also comments with an utterance 122-6, viz., "I just can't stand rules. Rules, rules, rules," another two minutes later, and the listener 180-1 responds to the comment with another utterance 162-5, viz., "Right on!" Finally, the creator 110 asks another question with an utterance 122-7, viz., "Good luck—and don't let the man keep you down," ten minutes into the interview, and the listener 180-1 responds with another utterance 162-6, viz., "Bring it home, Daddy-O."

Figure 1F:
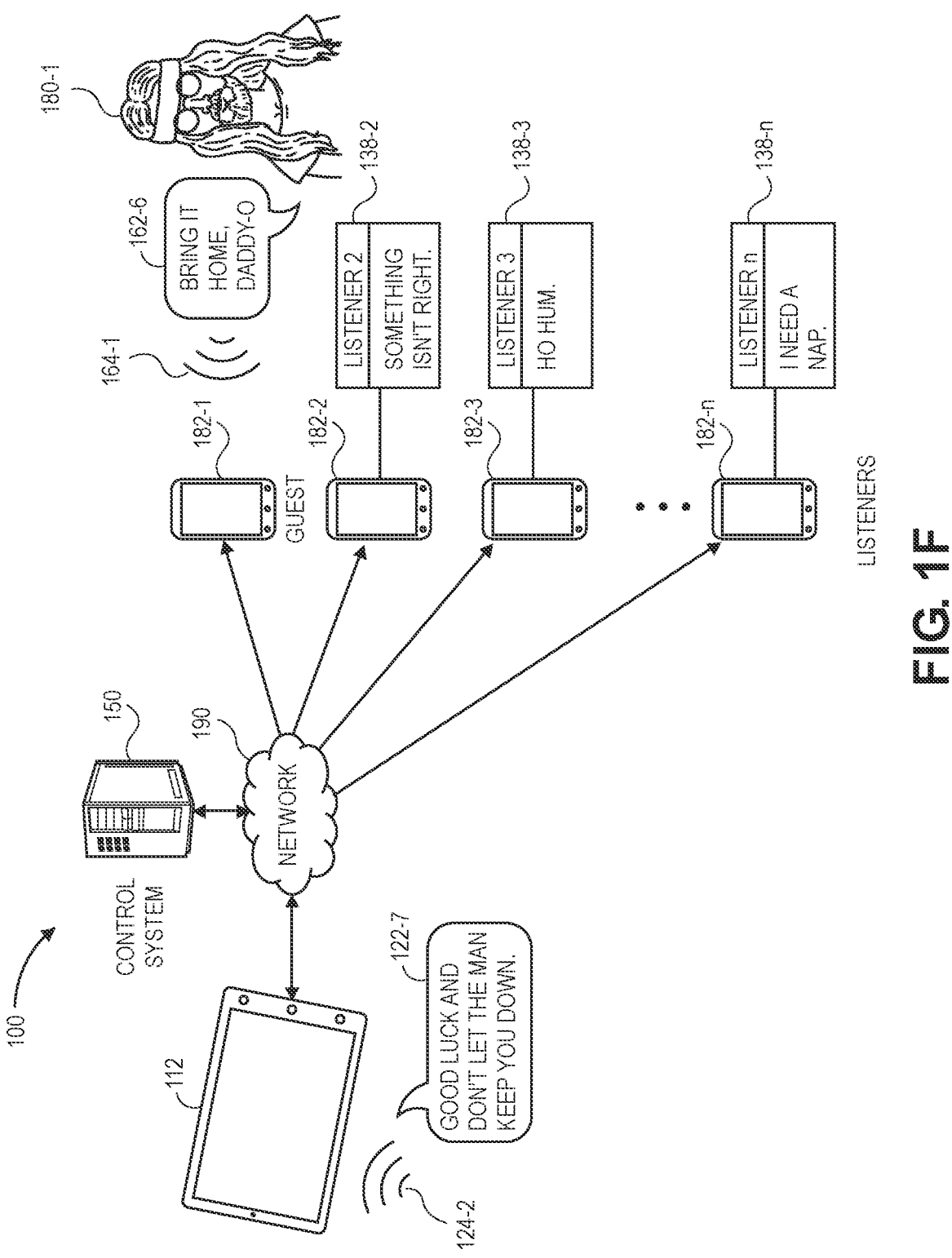

Content of a media program may also be moderated based on information or data regarding users, including but not limited to interactions received from listeners (or a creator, one or more guests, or other participants), and whether any of such interactions include a report of a violation of one or more rules. As is shown in FIG. 1F, as the audio data 124-2, 164-1 is received from the device 112 of the creator 110 and the device 182-1 of the listener 180-1 in accordance with the media program, interactions 138-2, 138-3 . . . 138-$n$ are received from listeners 180-2, 180-3 . . . 180-$n$ via the other devices 182-2, 182-3 . . . 182-$n$. The interaction 138-2 includes a chat message reading, "Something isn't right," while the interaction 138-2 includes a chat message reading, "Ho hum," and the interaction 138-$n$ includes a chat message reading, "I need a nap."

Figure 1G:
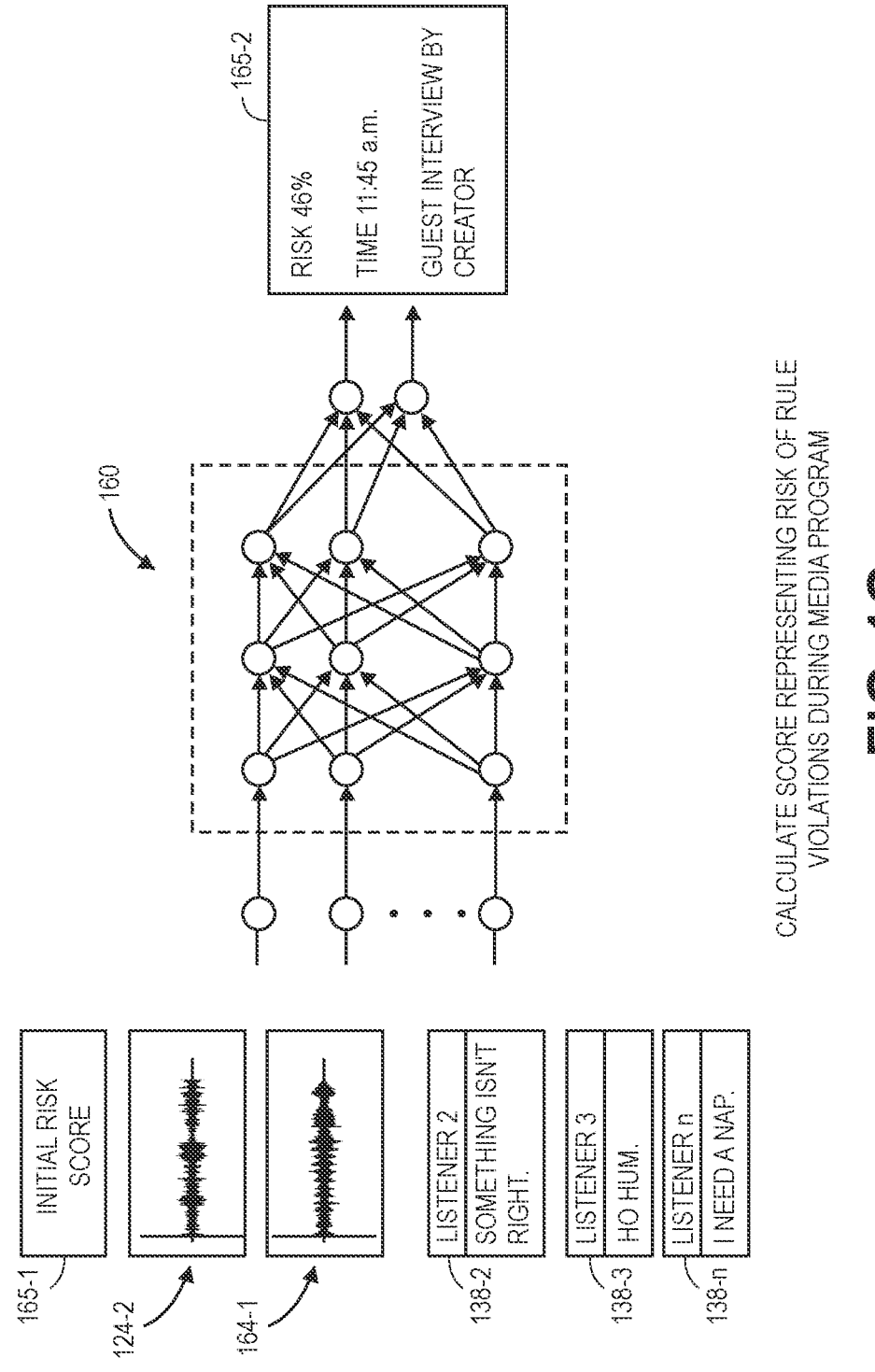

As is shown in FIG. 1G, an initial risk score determined based on the outputs 165-1 as shown in FIG. 1C, the audio data 124-2 captured by the mobile device 112 or the ear buds 113 and the audio data 164-1 captured by the device 182-1 as shown in FIG. 1E are provided along with the interactions 138-2, 138-3 . . . 138-$n$ shown in FIG. 1F as inputs to the model 160. Outputs 165-2 received from the model 160 may be processed to determine a risk score or a level of risk of violation of one or more rules, e.g., forty-six percent, based on the inputs. The outputs 165-2 may also identify a time associated with the risk score or the level of risk and media content being played at the time. In some implementations, the inputs to the model 160 may further include the initial risk score calculated based on the outputs 165-1, as well as any other information or data, such as the information regarding the history of the creator 110 or the metadata 175 regarding the media program that were provided to the model 160 as inputs, as shown in FIG. 1C.

The outputs 165-2 indicate a higher level of risk of a violation than the outputs 165-1. For example, as is shown in FIG. 1E, where the utterances of the creator 110 and the listener 180-1 indicate a certain extent of displeasure or dissatisfaction with rules, advocate that rules are unnecessary, or recommend that rules should be broken or disregarded, the model 160 may also identify or suggest an elevated risk that one or more rules might be violated, and a risk score (e.g., a "live" risk score) may be calculated or updated based on the outputs 165-2 accordingly. Alternatively, or additionally, as is shown in FIG. 1F, where interactions received from listeners, e.g., the interaction 138-2, a chat message stating "Something isn't right," report or suggest that a violation may have occurred or might be imminent, the model 160 may also identify or suggest an elevated risk that one or more rules might be violated, and a risk score may be calculated or updated based on the outputs 165-2 accordingly.

As is discussed above, one or more remedial actions may also be identified or selected and executed based on a risk score or a level of risk determined from the outputs 165-2. For example, where a risk score or a level of risk determined by the model 160 is substantial, but not in excess of a threshold requiring termination or another action that would remove or diminish the control of the creator 110 over the media program, a warning or other representation of information or data regarding the risk score or the level of risk may be provided to the creator 110, e.g., by transmitting information or data to the device 112 of the creator 110 and causing the information or data to be displayed on the display 115, e.g., in one or more user interfaces.

Figure 1H:
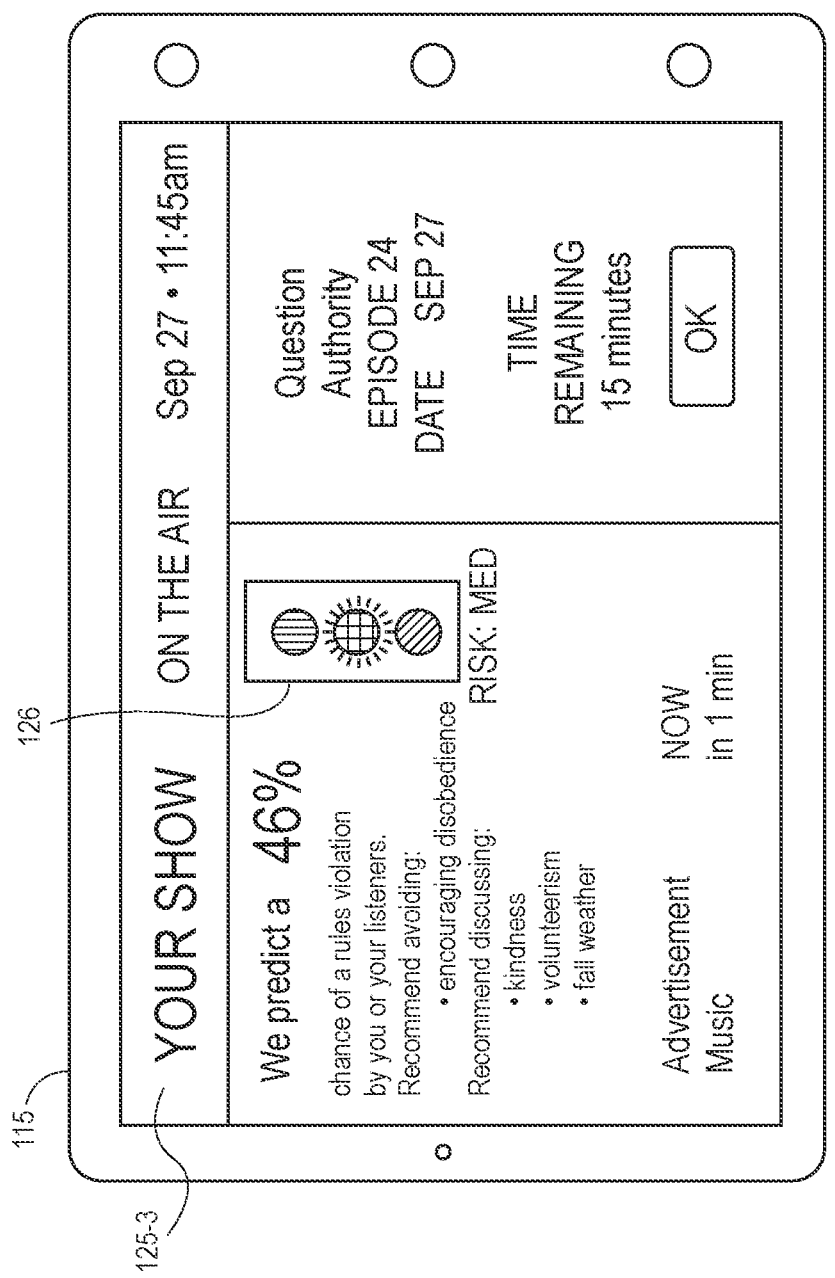
Figure 11:
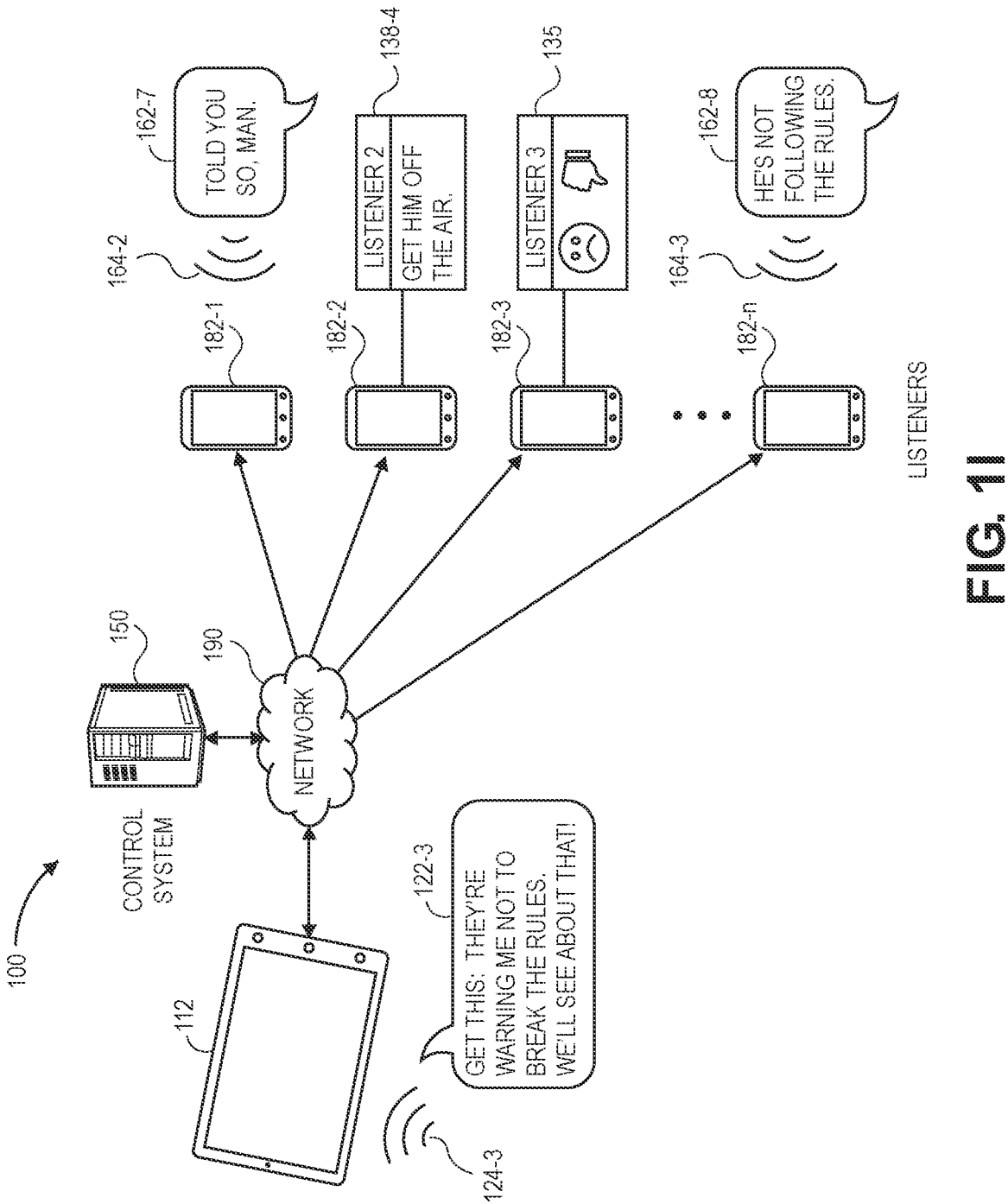

For example, as is shown in FIG. 1H, a user interface 125-3 including a set of text and a modified visual proxy 126 identifying the risk score or the level of risk calculated based on the outputs 165-2 is presented to the creator 110 on the display 115. The visual proxy 126 is the image representing the traffic light of FIG. 1D, but with a yellow light that is glowing or illuminated, and a set of text "RISK: MED," which visually informs the creator 110 that the risk score or the level of risk associated with his or her media program calculated based on the outputs 165-2 has increased with respect to the initial risk score calculated based on the outputs 165-1 but is not yet excessive or problematic. Alternatively, or in addition to the visual proxy 126 or the set of text, the user interface 125-3 may further include a number or another quantitative representation of the risk score determined based on the outputs 165-2. The user interface 125-3 also displays topics that may have been responsible for an increase in the risk score or the level of risk, viz., "encouraging disobedience," and recommends that the creator 110 avoid such topics, while also recommending that the creator 110 steer toward other topics, viz., "kindness," "volunteerism," or "fall weather," to reduce the risk score or the level of risk.

Following the warning of FIG. 1H, media content may be continuously moderated throughout a media program by determining text expressed in the media content, generating audio features based on the media content, or generating user features regarding a creator or one or more listeners or other participants, and providing the text, the audio features, the user features, or any other information or data to the model 160 on a regular or continuous basis. As is shown in FIG. 1I, the creator 110 provides an utterance 122-3, viz., "Get this: they're warning me not to break the rules. We'll see about that!" to the mobile device 112, which captures data 124-3 representing at least the utterance 122-3. Additionally, interactions or other responses are received from listeners or other users. For example, an interaction including audio data 164-2 representing an utterance 162-7, viz., "Told you so, man," is received by the control system 150 from the device 182-1 of the listener 180-1. An interaction 138-4 including a chat message, viz., "Get him off the air!" is received by the control system 150 from the mobile device 182-2. An interaction 135 including selections of a pair of "emoji," or digital icons, images or symbols representative of emotions or opinions is received by the control system 150 from the mobile device 182-3. An interaction including audio data 164-3 representing an utterance 162-8, viz., "He's not following the rules," is received by the control system 150 from the device 182-*n*.

Figure 1J:
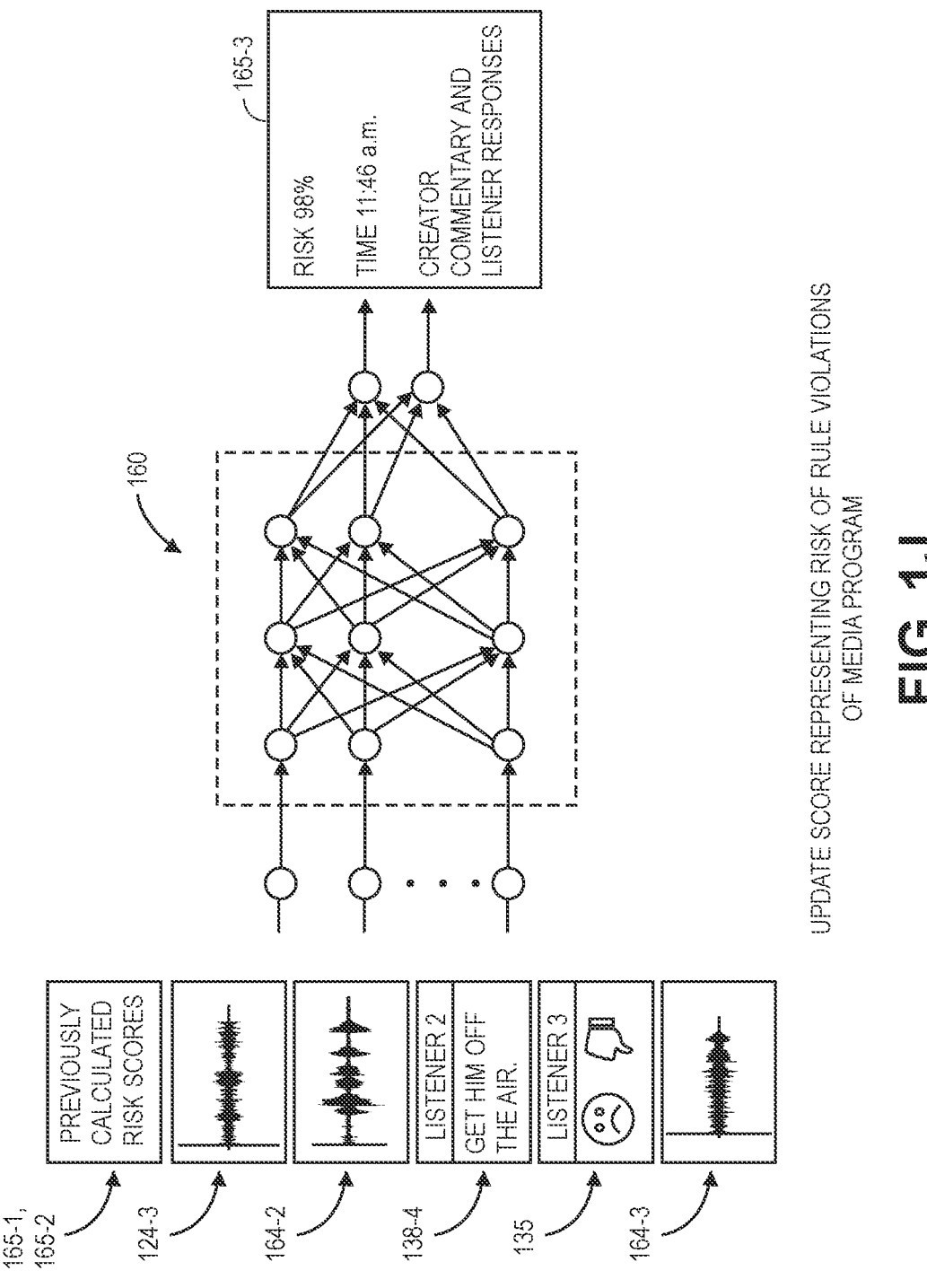

As is shown in FIG. 1J, risk scores previously calculated based on the outputs 165-1, 165-2 are provided along with the audio data 124-3 captured by the mobile device 112 or the ear buds 113, the audio data 164-2 captured by the device 182-1 and the audio data 164-3 captured by the device 182-*n* and the interactions 138-4, 135 as inputs to the model 160. A risk score or a level of risk of violation of one or more rules, e.g., ninety-eight percent, may be calculated or otherwise determined based on outputs 165-3 received from the model 160, which may also identify a time associated with the risk score or the level of risk and media content being played at the time.

Figure 1K:
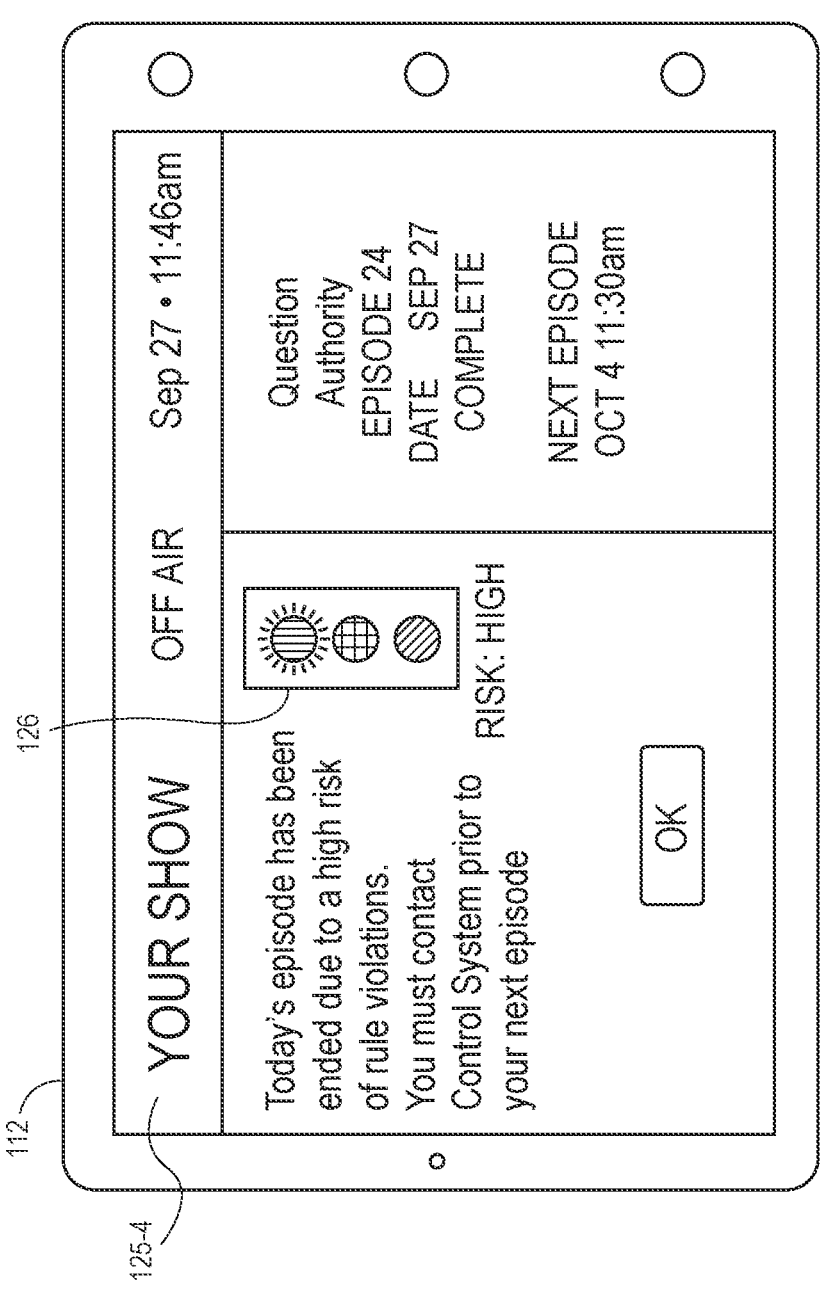

One or more remedial actions may be identified or selected and executed based on the risk score or the level of risk determined from the outputs 165-3. For example, because the risk score or the level of risk determined from the outputs 165-3 is sufficiently high, the media program may be automatically terminated, e.g., in response to a violation or to avoid the violation, and alternate media content may be identified and aired during a balance of time during which media content was to have been aired in accordance with the media program. As is shown in FIG. 1K, a user interface 125-4 including a set of text or other information or data reporting the termination to the creator 110 and a modified visual proxy 126 identifying the risk score or the level of risk calculated based on the outputs 165-3 is presented to the creator 110 on the mobile device 112. The user interface 125-4 reports the termination of the media program and the reasons for the termination. Additionally, the visual proxy 126 is the image representing the traffic light of FIG. 1D, but with a red light that is glowing or illuminated, and a set of text "RISK: HIGH," which visually informs the creator 110 that the risk score or the level of risk associated with his or her media program calculated based on the outputs 165-3 is significantly elevated. The user interface 125-4 further informs the creator 110 of one or more remedial actions that are required in order to address the violation.

Figure 1L:
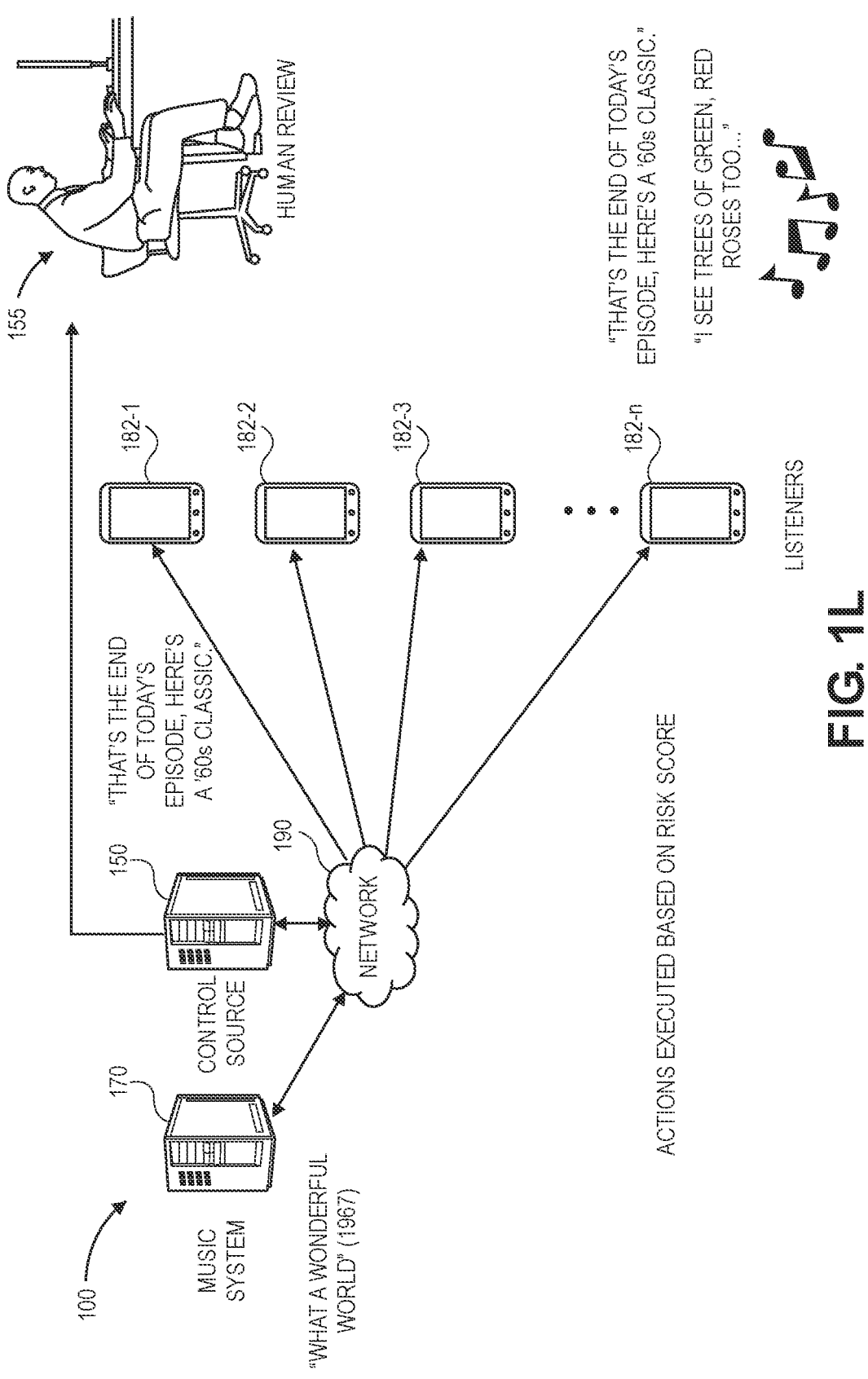

Additionally, the control system 150 or any other system may also identify one or more other remedial actions as a response to, or to accompany, the termination of the media program. As is shown in FIG. 1L, the control system 150 establishes a connection with a music source 170 (or catalog or repository) and selects a media entity, viz., the 1967 song "What a Wonderful World," by Louis Armstrong, stored thereon to be played by each of the devices 182-1, 182-2, 182-3 . . . 182-*n* of the listeners. The control system 150 then identifies or generates one or more phrases or other sets of words announcing the ending of the media program, viz., "That's the end of today's episode. Here's a '60s classic," and transmits media content representing such phrases or words, along with media content including the selected media entity, to each of the devices 182-1, 182-2, 182-3 . . . 182-*n* of the listeners to be played thereon. The media content (e.g., the phrases or other sets of words and/or the media entity) may be selected on any basis, such as any measure or indication of similarity between the media content and the media program, the creator 110, or any of the listeners 180-1, 180-2, 180-3 . . . 180-*n*, as well as any relation between the media content and a rule that was violated, or an extent of the violation. For example, the phrases or sets of words, or the media entity, may be selected with a goal or an intent of reducing a risk score or a level of risk of violation, or with a goal or an intent of responding to or counteracting an elevated risk score or level of risk of violation, or for any other goal or intent.

Alternatively, or additionally, information or data regarding a violation (e.g., a specific rule that may have been violated or is at risk of violation, as well as the risk score, the identity of the creator 110, as well as any identities of any listeners or media content being played at a time that the risk score was calculated) may be provided to a human actor 155 for further review. The human actor 155 may verify or validate whether any actions that were identified or automatically executed were appropriate, whether any penalties or remedial actions that were established should remain in effect or be enhanced or revoked, or identify or execute any other action. Information or data regarding the violation, including but not limited to any actions subsequently taken by the human actor 155, the creator 110, or any other entity, may be stored in one or more data stores, which may be associated with the control system 150 or any other device or system accordingly.

Accordingly, the systems and methods of the present disclosure process data received or transmitted in accordance with a media program using one or more tiers of machine learning models to moderate content of the media content and determine whether such media programs have violated one or more rules, or are at risk of violating one or more of such rules, and to identify, select and execute any number of actions in response to determining that a media program has violated one or more of such rules, or is at risk of violating one or more of such rules. The rules for which media content may be moderated may include, but need not be limited to, restrictions on types or categories of content, or specific content (e.g., profanity, pornography, incitements to violence, misinformation, breaches of contract or trust, or others).

Media content that is received from any source and transmitted to devices of users (e.g., creators, listeners or others) may be processed according to any machine learning algorithms, systems or techniques, e.g., in a first tier, in order to transcribe or otherwise identify words uttered within such media content, or to determine any other features (e.g., audio features) of the media content.

In some implementations, audio data including or representing media content may be processed by one or more natural language understanding (or "NLU") processing modules, a speech recognition engine or module, or another processing module, to identify words represented in the audio data. For example, one or more computer devices or systems may transform audio data for processing by a speech recognition engine or module, which may compare the data to one or more acoustic models, language models or other data models to recognize any words incorporated in the audio data. In some implementations, data captured by a device or received from any source may be processed, e.g., by an acoustic front end, to reduce noise or divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, one or more audio features may be determined using a speech recognition engine or module, which may further process outputs of an acoustic front end by reference to information or data stored in a speech model storage. In some other implementations, a speech recognition engine may attempt to match features, or feature vectors, to phonemes or words identified by or stored in association with one or more acoustic models, language models, or other models. In some implementations, a speech recognition engine may also compute one or more values or scores for such feature vectors based on any information, data or metadata regarding the audio data, such an acoustic score representing a likelihood that a sound represented by a group of feature vectors matches a language phoneme. An acoustic score may be further adjusted based on an extent to which sounds and/or words are heard or used in context with each other, thereby enhancing a likelihood that an output of a speech recognition module or engine will make sense grammatically. Such models may be general, e.g., with respect to a language, or specific with respect to a particular domain. Additionally, a speech recognition engine or module may use any number of techniques to match feature vectors to phonemes, e.g., Hidden Markov Models (or "HMM") to determine probabilities of matches between feature vectors and one or more phonemes. Speech recognition modules or engines may operate on any number of devices, including but not limited to a device that captured the audio data of a voice sample, one or more computer devices associated with a broadcast system, or a device associated with a creator. Results identified by a speech recognition module or engine may be provided to one or more other components, in the form of a single textual representation of speech included in a voice sample, a list of any number of hypotheses and respective scores, or any other representation.

In some implementations, one audio feature that may be identified in accordance with implementations of the present disclosure, e.g., using one or more machine learning algorithms, systems or techniques, may include a sentiment of the media content, or one or more evaluations, attitudes, appraisals, emotions, moods or judgments represented within the media content. For example, a sentiment or opinion may be identified or classified with respect to a transcript of media content as a whole, or with respect to one or more individual portions (e.g., passages, paragraphs or sentences) of the media content. When analyzing media content or a portion thereof in order to identify a sentiment or opinion expressed therein, the media content may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment or opinion of media content may be identified broadly in terms of polarity, i.e., whether the media content is generally positive, negative or neutral, or in terms of grades or degrees. For example, media content may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment from media content, a transcript or other set of text or any data or information included in the media content may be analyzed in any manner. For example, one or more machine learning algorithms or techniques may be provided to determine a sentiment from a transcript of the media content, or the media content itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the media content, and to identify any pertinent keywords maintained therein, which may be analyzed and associated with one or more sentiments thereof.

In some implementations, one audio feature that may be identified in accordance with implementations of the present disclosure, e.g., using one or more machine learning algorithms, systems or techniques, may include a topic (or a theme) identified from a set of words included in utterances received from creators, listeners or other participants in a media program. The topic (or theme) may be identified in any manner, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others. In some implementations, a topic (or a theme) may be identified by counting words (including any known synonyms) appearing within a set of words, or defining groups of the words that best represent the set. In some implementations, a topic (or a theme) may be identified based on an extent to which words are repeated within the set of words, or a frequency with which such words appear, as well as how such words are used within individual chat messages or the set of words as a whole. A topic (or a theme) may also be identified by comparing and contrasting different portions of a set of words, e.g., portions spoken by different speakers (e.g., creators, listeners or other participants), or based on text not actually included within the set of words. A topic (or a theme) may also be identified based on any metaphors or analogies included within a set of words as a whole, as well as based on any transitions or connections between any portions of the set of words.

Additionally, in some implementations, a topic (or a theme) may be identified or designated by a creator, a listener or another individual, who may be prompted or encouraged to apply one or more tags or other labels indicative of a topic, or to identify a point in time during which a topic of the portion of the media content has changed. Records of such tags or labels, or times at which such tags or labels were received, may be stored and utilized to identify one or more topics associated with the portion of the media content. Alternatively, a topic (or a theme) may be identified from a set of words, on any other basis. Furthermore, a topic (or a theme) may be identified at any point in time and from any portion of media content. Topics (or themes) may be identified based on any words spoken by any participants (e.g., creators or listeners) in a media program, or based on words spoken by all of the participants in the media program. Tags or descriptions of the topics of discussion may be automatically generated, or selected by a creator or another speaker identified during the media content.

Additionally, as is also discussed above, information or data regarding one or more users of a media program such as a creator of the media program, one or more listeners to the media program, or any guests or other participants in the media program, may be processed, e.g., using one or more machine learning algorithms, systems or techniques, to determine one or more features of such users, or "user features." Information or data regarding a user that may be processed to determine user features may include, but need not be limited to, a list or a set of media programs associated with the listener (e.g., media programs conceived by a creator, media programs listened to by a listener, media programs on which a guest has appeared, or the like), as well as attributes of such programs (e.g., subjects, topics, themes, ratings, numbers of episodes, times of day or days of week on which episodes of such programs are aired, or other attributes). Information regarding the user that may be processed to determine user features may also include a record of interactions received from or associated with the user, including but not limited to actions for playing, pausing, stopping, advancing or rewinding media content by the user, chat messages received from the user, voice samples received from the user, expressions of emotions by the user (e.g., by selections of emojis associated with such emotions, or in any other manner), or any other interactions. Moreover, information regarding the user that may be processed to determine user features may include reports of violations of rules by another user, and whether such reports were ultimately confirmed as violations, as well as numbers of any confirmed violations, or specific rules that were allegedly or confirmed to have been violated.

Any other information or data regarding a user may be processed to determine a user feature for that user in accordance with implementations of the present disclosure.

As used herein, the term "rule" may refer to any of any type or form of established standard, guide, or requirement that is established by any relevant authority, and prescribes or directs some type or form of action or forbearance. For example, a rule may be established by any legislative, executive, judicial, administrative or other legal entity that is so empowered, e.g., by one or more other rules. A rule may also be established by any private entity, such as an owner or operator of a control system, a broadcast system, a conference system or a mixing system, as described herein. As used herein, the term "rule" may be synonymous or interchangeable with the terms "law," "policy," "regulation" or "requirement," or other like terms.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
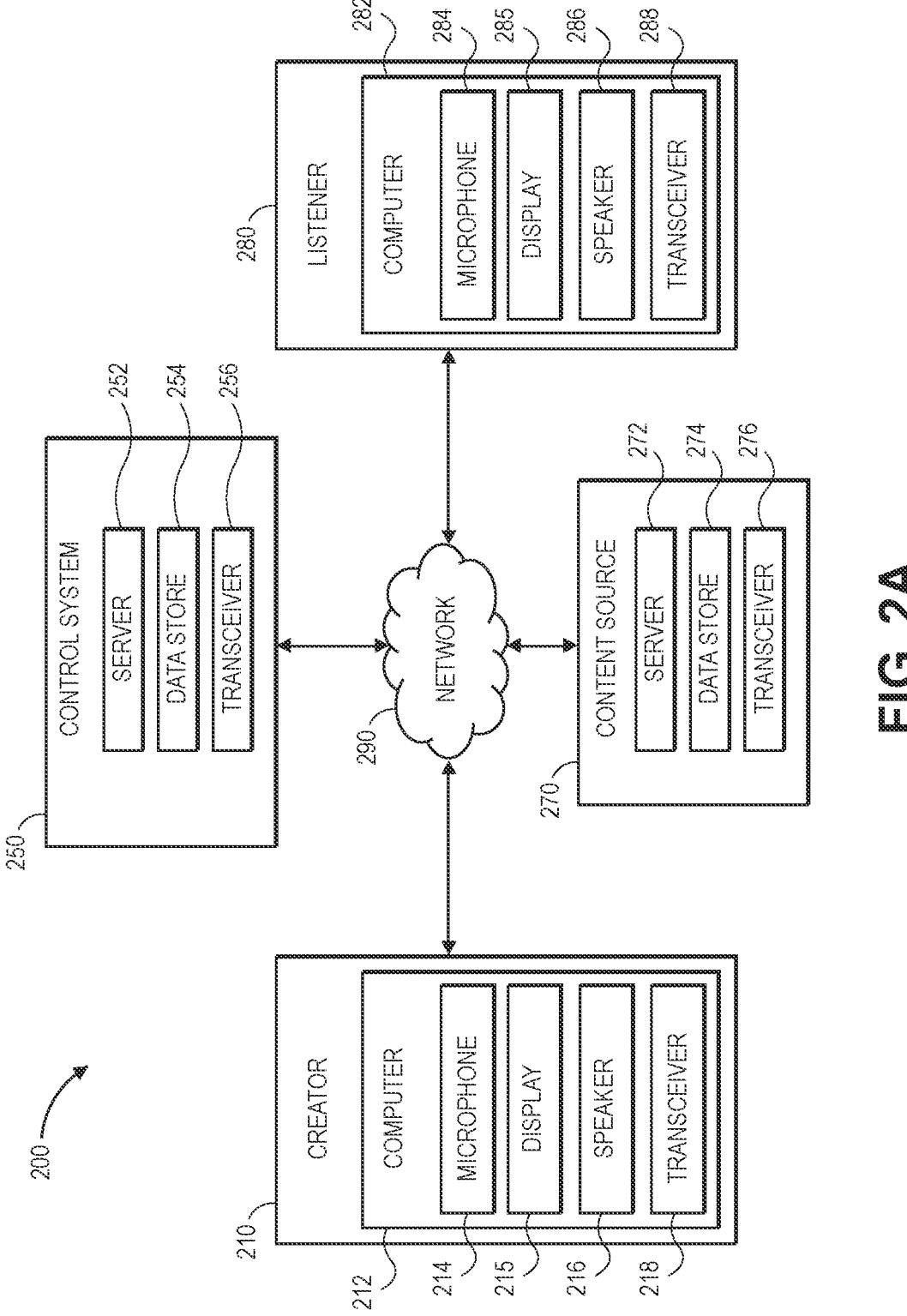
FIGS. 2A and 2B are block diagrams of components of one system for moderating content in accordance with embodiments of the present disclosure.
Figure 2B:
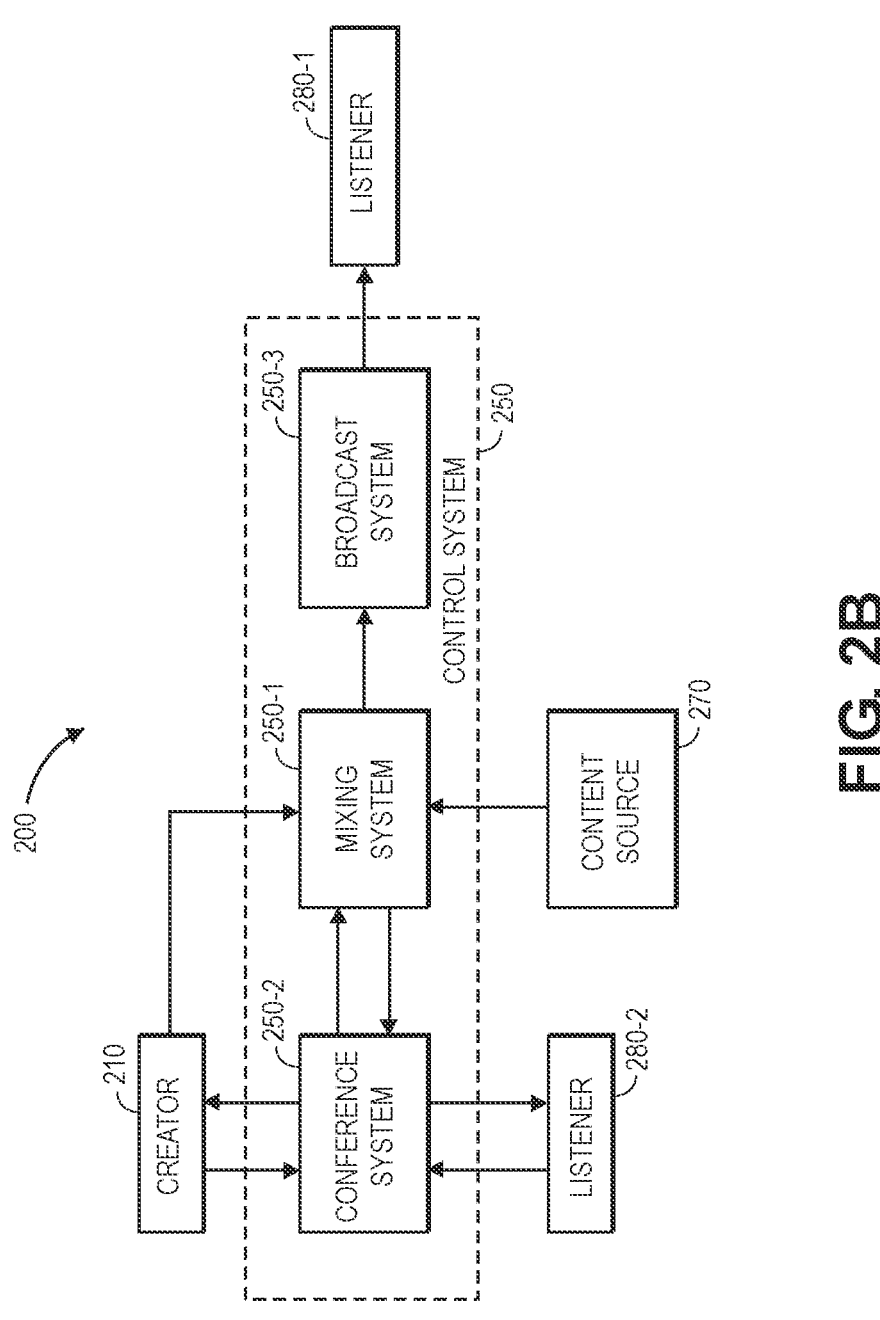

Referring to FIGS. 2A and 2B, block diagrams of components of one system 200 for moderating content in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1L.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener

280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMS, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
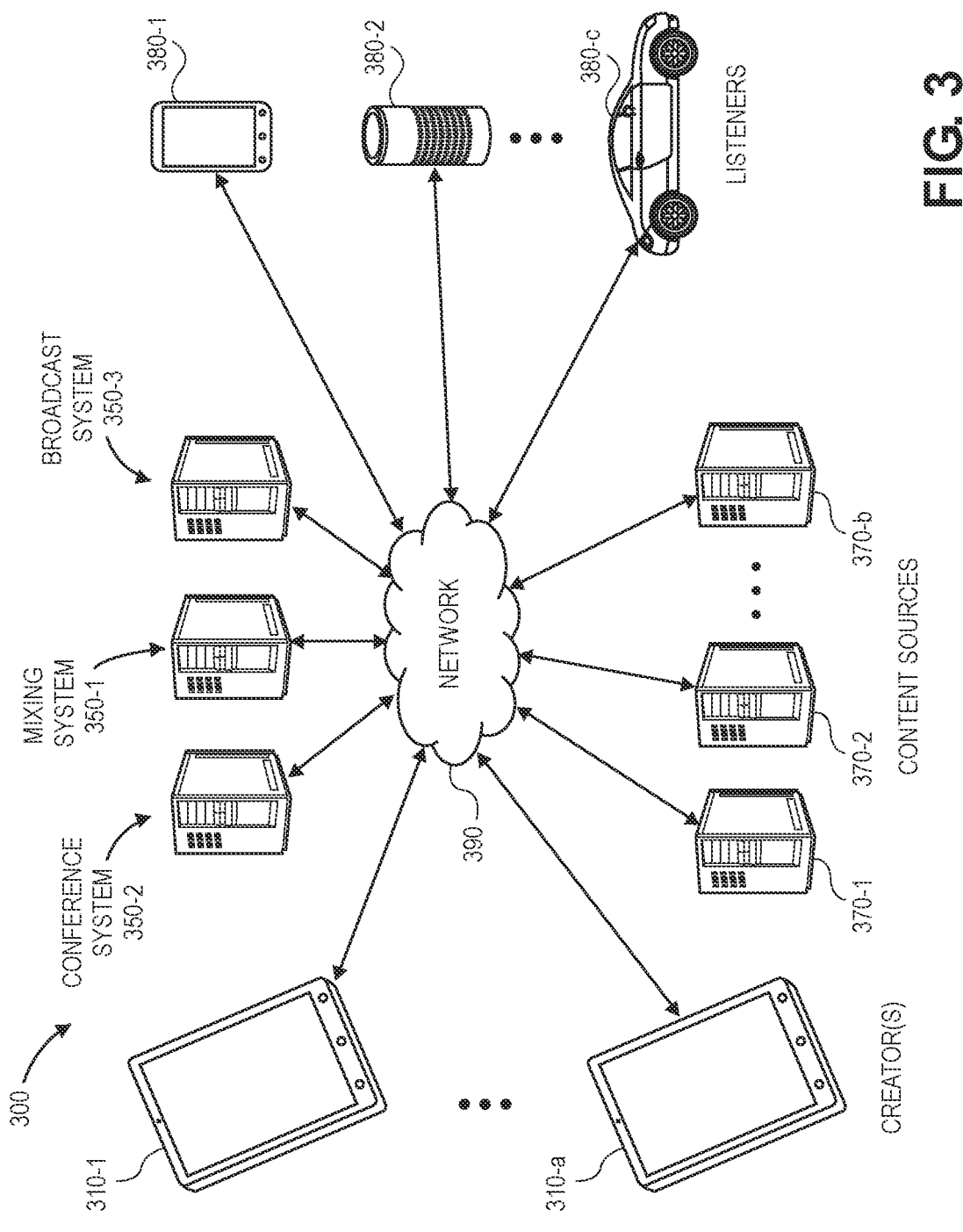
FIG. 3 is a view of aspects of one system for moderating content in accordance with embodiments of the present disclosure.

Referring to FIG. 3, a view of aspects of one system for monitoring live broadcasts in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1L. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-a and, alternatively, any of the listeners 380-1, 380-2 . . . 380-c, who may be invited or authorized to participate in a media program, e.g., by providing media content in the form of spoken or sung words, music, or any media content, subject to the control or discretion of the creators 310-1 . . . 310-a. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-a. In some implementations, the mixing system 350-1 may effectively act as a virtual participant in such a conference, by transmitting media content received from any of the media sources 370-1, 370-2 . . . 370-b to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-c.

Likewise, the broadcast system 350-3 may be any server or other computer system or device configured to receive information or data from the mixing system 350-1, or transmit any information or data to any of the listeners 380-1, 380-2 . . . 380-c over the network 390. In some implementations, the broadcast system 350-3 may establish one-way communications channels with the mixing system 350-1 or any of the listeners 380-1, 380-2 . . . 380-c in accordance with a broadcast plan (or a sequence of media content, or another schedule), or at the direction of the creators 310-1 . . . 310-a. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-a.

The content sources 370-1, 370-2 . . . 370-b may be servers or other computer systems having media content stored thereon, or access to media content, that are configured to transmit media content to the creators 310-1 . . . 310-a or any of the listeners 380-1, 380-2 . . . 380-c in response to one or more instructions or commands from the creators 310-1 . . . 310-a or the mixing system 350-1. The media content stored on or accessible to the content sources 370-1, 370-2 . . . 370-b may include one or more advertisements, songs or media files, news programs, sports programs, weather reports or any other media files, which may be live or previously recorded. The number of content sources 370-1, 370-2 . . . 370-b that may be accessed by the mixing system 350-1, or the types of media content stored thereon or accessible thereto, is not limited.

The listeners 380-1, 380-2 . . . 380-c may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-a, with any of the content sources 370-1, 370-2 . . . 370-b, or with any of the listeners 380-1, 380-2 . . . 380-c, as necessary, to compile and seamlessly transmit media programs over digital channels (e.g., web-based or application-based), to devices of the creators 310-1 . . . 310-a or the listeners 380-1, 380-2 . . . 380-c in accordance with a broadcast plan, or subject to the control of the creators 310-1 . . . 310-a. Furthermore, in some implementations, one or more of the listeners 380-1, 380-2 . . . 380-c, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4A:
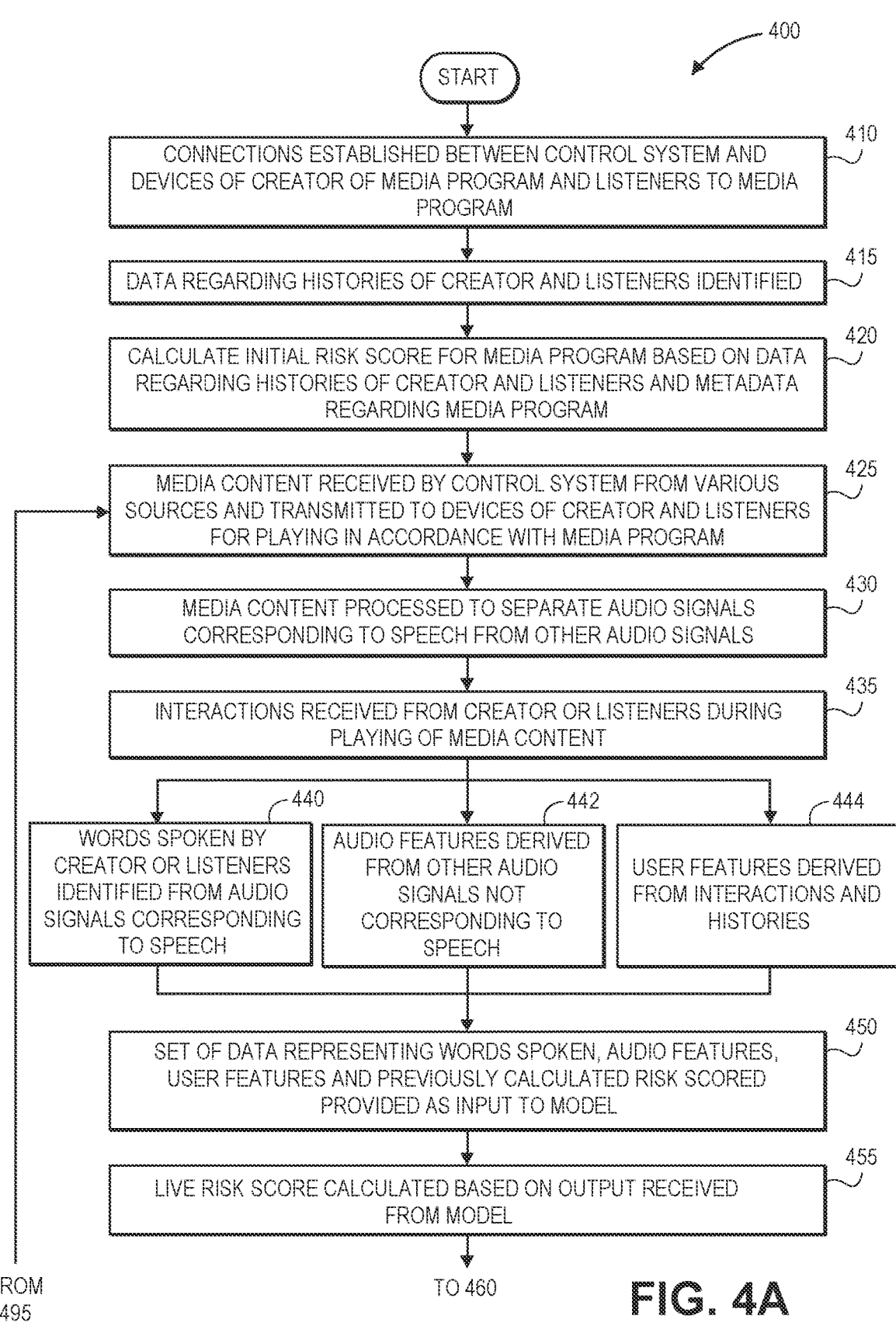
FIGS. 4A and 4B are a flow chart of one process for moderating content in accordance with embodiments of the present disclosure.
Figure 4B:
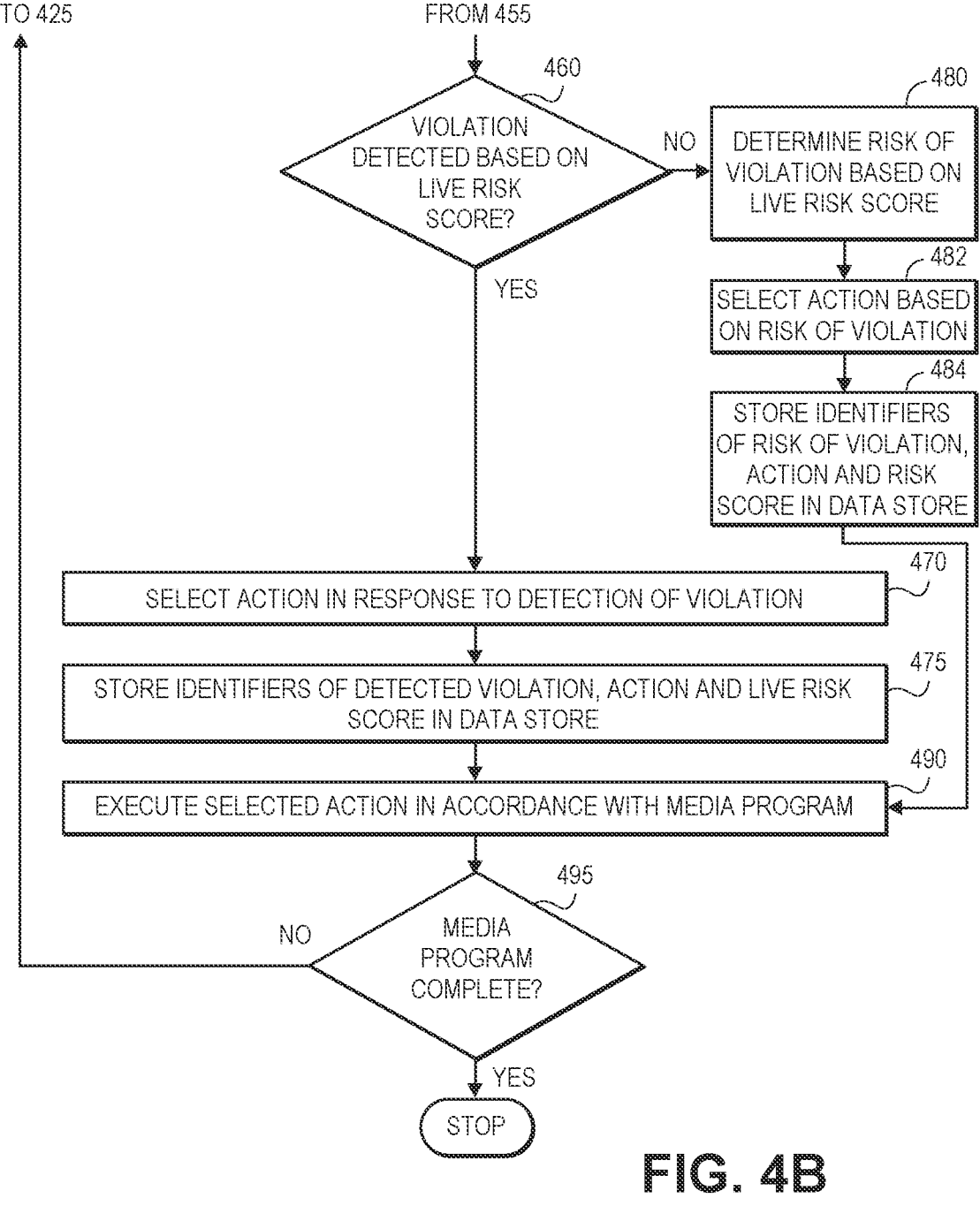

Referring to FIGS. 4A and 4B, a flow chart 400 of one process for moderating content in accordance with embodiments of the present disclosure is shown.

At box 410, connections are established between a control system and devices of a creator of a media program, and of listeners to the media program. For example, in some implementations, a two-way communications channel may be established between a control system and a computer device (e.g., a mobile device, or any other device) of the creator, thereby enabling the creator to transmit audio data representing words that are spoken, sung or otherwise created by the creator to the control system and receive audio data from the control system. Likewise, a one-way communication channels may be established between the control system and each of the devices of the listeners, thereby enabling the listeners to receive audio data from the control system. In some implementations, the connections may be established by or between multiple systems, such as a conference system, a mixing system, a broadcast system, or any other systems, alone or in addition to a control system. Moreover, in some implementations, connections may be established between a control system (or any other systems) and devices or systems of other participants in the media program, e.g., sources of advertisements, music, news, sports, weather, or other programming, or humans other than the creator or any listeners.

At box 415, data regarding histories of the creator and the listeners is identified (or determined). For example, the histories may identify media programs associated with a creator (e.g., episodes of the current media program, or prior media programs or episodes thereof), as well as any history of violations of rules by the creator during such media programs, and types or extents of such violations. Likewise, the histories of the listeners may identify other media programs to which such listeners listen or subscribe, as well as interactions provided by such listeners during episodes of such other media programs, and whether the interactions include or represent reports of violations received from such listeners during other media programs. Such interactions may include, but need not be limited to, interactions received via user interfaces rendered by one or more devices of such listeners.

In some implementations, the user interfaces may include one or more interactive features that enable users to express an opinion or other emotion regarding a media program, e.g., any number of icons, characters, symbols or other visual indicators, each of which may correspond to one of a plurality of emotions, opinions or characterizations, and may be selected or otherwise interacted by listeners to indicate their emotions, opinions or characterizations at any given time. For example, in some implementations, the user interfaces may include one or more "widgets," application programming interfaces (e.g., "API"), or other features that are configured to receive interactions in the form of entries of text, characters or symbols, as well as selections or other interactions indicating an emotion or an opinion regarding the media program. The interactions received from the users may include, but need not be limited to, selections of one or more icons, characters, symbols or other visual indicators provided on the user interfaces, e.g., in response to gestures or other interactions with an input/output device, or one or more spoken commands or utterances, may be processed to confirm that a user approves of media content then being played, disapproves of the media content, or has some emotion or opinion other than approval or disapproval of the media content.

Alternatively, or additionally, interactions received from users may include actions by a user to play or pause a media program, or to fast-forward or rewind the media program, and such interactions may be processed or interpreted to determine whether the user has a positive emotion or opinion, a negative emotion or opinion, or an emotion or an opinion that is neither positive nor negative at any given time with respect to the media program. Likewise, when a user generates or sends a chat message, such interactions may be processed or interpreted to determine an emotion or an opinion of the user at any given time with respect to the media program. When a user attempts to join a media program, the attempt may be processed or interpreted to determine that the user is interested in media content of the media program then being played.

Alternatively, when a user elects to stop the media program, search for another media program, or end the playing of media altogether either permanently or for a period of time, such interactions may also be processed or interpreted to determine an emotion or an opinion of the user at any given time with respect to the media program. The systems and methods of the present disclosure are not limited to considering interactions with interactive features having symbols representative of emotions or opinions, receiving chat messages or requests to join a media program, in accordance with implementations of the present disclosure. Furthermore, in some implementations, an interaction may be received from a user by any voice-controlled devices or software (e.g., a personal assistant). For example, one or more devices of user may be configured to receive voice commands that may be processed to identify feedback represented therein.

In some implementations, the data may include scores or evaluations of interactions received from the listeners as to a level of trustworthiness associated with such interactions.

At box 420, an initial risk score is calculated for the media program based on the data regarding the histories of the creator of the media program and the listeners to the media program, and metadata regarding the media program. For example, the initial risk score may be a preliminary probability or a likelihood of a risk that one or more rules may be expected to be violated during the media program, and may be calculated based on any available information or data regarding the creator of the media program or the listeners to the media program, e.g., a track record of violations of various types or extents that may be associated with the media program or other media programs with which the creator or the listeners are associated. Alternatively, or additionally, the initial risk score may be calculated based on any similarities between the media program and other media programs of the creator or any of the listeners.

At box 425, media content is received by the control system from various sources and transmitted to the device of the creator and the devices of the listener for playing in accordance with the media program. The media content may include or be represented in audio data captured by one or more devices of the creator, or audio data stored or otherwise maintained by one or more sources, that is transmitted to a control system and to the various other devices with which the control system is connected.

At box 430, the media content transmitted to the devices of the creator and the listeners is processed to separate audio signals corresponding to speech from other audio signals represented in the media content. For example, the media content may be processed according to one or more audio source separation or signal processing techniques to separate words that are spoken or sung from other content, including but not limited to music, advertisements or background noises. Alternatively, or additionally, where the audio signals corresponding to speech include or represent words spoken or sung by multiple participants in the media program, the audio signals may be further processed to identify portions of such signals that are spoken or sung by different participants, e.g., according to one or more speaker diarization techniques.

At box 435, one or more interactions are received from the creator or the listeners (e.g., users) during the playing of media content by their respective devices. As is discussed above, one or more of the interactions may include chat messages, voice samples, requests to participate in a media program, designations of emotions, attempts to play, pause, stop, advance or rewind media content, or any other type or form of interaction. Moreover, as is also discussed above, one or more of the interactions may be scored or otherwise evaluated to determine a level of trustworthiness of each of such interactions. Such scores or evaluations may indicate a probability or a likelihood that content of an interaction is legitimately related to or associated with a violation of one or more rules. For example, where a chat message or a voice sample indicates that a listener is happy or unhappy with, or agrees or disagrees with, media content associated with the media program may be determined from text of the chat message, or a transcript or audio features of the voice sample. Alternatively, or additionally, where a listener closes or turns off a device or application playing a media program, such an interaction may indicate unhappiness or dissatisfaction with the media program, and where a listener who rewinds or increases a level of volume of a media program, such an interaction may indicate happiness or satisfaction with the media program. Any type or form of interaction received from a user or participant in a media program (e.g., a creator, one or more listeners, or others) may be received and interpreted in accordance with implementations of the present disclosure.

In some implementations, one or more of the rules may relate to conduct of a creator, or any guests, listeners or other participants of the media program, including but not limited to restrictions on language used by such participants (e.g., whether such participants may use profanity or objectionable language), content that may be included in a media program (e.g., media entities or types of media entities that may be transmitted to devices of listeners in accordance with a media program), advertisements to be included in the media program (e.g., time limits or requirements for the playing of one or more advertisements, or identifications of specific advertisements that may or may not be aired in accordance with a media program), system performance or network connectivity during the media program (e.g., operational standards that must be met by devices of the creator or any listeners, or by the control system, a conference system, a mixing system or a broadcast system, or any other system), or any other factors.

At box 440, words spoken by the creator or any listeners are identified from the audio signals corresponding to speech that were separated from other signals not corresponding to speech at box 430. The words may be transcribed in any manner, e.g., in real time or in near-real time, by automated speech recognition or any other techniques, to identify the one or more words represented therein. Alternatively, the words identified from the audio signals may have been spoken or sung, or otherwise generated in any other manner.

In parallel, at box 442, one or more audio features are derived from the other signals not corresponding to speech. For example, such audio features may include, but need not be limited to one or more values, variables, vectors or other sets of data corresponding to or representative of emotions, tones, sentiments or other attributes of the media content. In some implementations, the audio features may be identified by one or more extraction techniques, such as spectrogram, chromogram, mel-frequency cepstral coefficients, linear prediction cepstral coefficients, short-time energy, or others.

Also in parallel, at box 444, one or more user features may be derived from the interactions received at box 435 and histories represented in the data identified at box 415. For example, the features may represent signals received from the creator or any of the listeners, and may represent their respective behavior during the media program or other media programs.

At box 450, a set of data representing the words spoken as identified at box 440, the audio features derived at box 442, or the user features derived at box 444, and any risk scores that were previously calculated for the media program (e.g., at least the initial risk score calculated at box 420) are provided to a model as an input. For example, in some implementations, the model may be an artificial neural network having an input layer, an output layer and one or more hidden layers that may operate subject to various activation functions defined with respect to nodes in each of such layers. In some other implementations, the model may be a gradient-based model, a tree-based model, a learning model, a random forest, a gradient-boosting tree, or others. In still other implementations, the model may be a transformer (e.g., a bidirectional encoder representation from transformers).

In some implementations, the input may be any embedding, vector or other representation or classification (e.g., a matrix, a table, or another set of data) of words spoken (or identifiers or labels representative of such words), features representative of audio signals, user data, or any other information or data regarding the media program, the creator or any of the listeners, as well as any previously calculated risk scores.

In some implementations, the model may be trained using similar sets of data, with each of such sets corresponding to one media program. For example, a set of data may include words, audio features and user features associated with a media program as training inputs, along with indications as to whether violations of rules were observed during the media program as training outputs. For example, the training outputs may be binary in nature, each having a value of zero where no violations were observed during a media program and a value of one where one or more violations were observed during the media program. Alternatively, where the training outputs represent violations of multiple rules, the training outputs may have values of zero for each of the violations that were not observed during a media program, and values of one for each of the violations that were observed during the media program. To train a model, the training inputs may be provided as inputs to the model, and outputs received from the model may be compared to the training outputs, e.g., according to one or more loss functions.

At box 455, a live risk score is calculated based on an output received from the model in response to the input provided to the model at box 450. For example, the live risk score may represent a probability or a likelihood that the media program is currently violating one or more rules, e.g., while the media program is live, or poses a risk of violation of one or more of the rules, and may be determined based on the words spoken as identified at box 440, the audio features derived at box 442, or the user features derived at box 444, along with any previously calculated risk scores. In some implementations, a single score may indicate a probability or a likelihood that a violation of any of a number of rules has occurred, is occurring or may occur during the media program. In some other implementations, however, a plurality of scores may be calculated, and each of such scores may indicate a probability or a likelihood that violations of respective ones of a plurality of rules have been observed, are occurring or may occur.

At box 460, whether a violation of one or more of the rules has occurred is determined based on the live risk score calculated at box 455. For example, where the live risk score exceeds a threshold associated with any of the rules, or a threshold associated with a specific one of the rules, then a violation may be determined or otherwise presumed to have occurred. If the live risk score does not exceed any relevant threshold, however, then a violation may not be determined or presumed to have occurred based on the live risk score alone. Alternatively, or additionally, whether a violation of any of the rules has occurred may be determined based on the live risk score alone, or based on the live risk score and any number of factors other than the initial risk score.

If a violation is determined to have occurred based on the live risk score calculated at box 455, then the process advances to box 470, where an action is selected in response to the detection of the violation. Such actions may include, but need not be limited to, terminating the media program, temporarily or permanently rescinding control over the media program from the creator, or transmitting information or data of any type or form, e.g., data representing media content or any other information or data, to computer devices of the creator or any guests, listeners or other participants. In some implementations, an action may be predetermined or preselected for a given violation during any media programs in general, or during a specific media program in particular. In some other implementations, an action may be selected based on any other factor, such as a type of violation, a degree of the violation, a number of prior violations associated with the media program, the creator or any participant.

Moreover, in some implementations, an action identified or selected may be automatically executed, e.g., by a control system or another computer device or system, in response to a detection of a violation. In some other implementations, an action identified or selected may be recommended for consideration, e.g., by a human actor, in response to a detection of a violation. In some implementations, whether an action is to be automatically executed, or recommended to a human actor, may be determined on any basis, such as a value of the live risk score, or on any other basis. Furthermore, in some implementations, such as where a creator of a media program or listeners to the media program have a limited or insignificant history of violations, where a violated rule is minor in nature, or where a media program has concluded shortly after or concurrent with the violation, it may be determined to not take any action in response to a detected violation, and the media program may be permitted to continue unhindered or without any further intervention.

At box 475, identifiers of the detected violation, the action selected at box 470, and the live risk score calculated at box 455 are stored in one or more data stores. Alternatively, or additionally, a time at which the violation occurred or was detected, or one or more portions of media content being played at the time, may be identified and stored in one or more data stores.

If a violation may not be determined to have occurred based on the live risk score, then the process advances to box 480, where a risk of violation is determined based on the live risk score. For example, the risk of violation may be determined as a probability or likelihood that one or more violations will occur, and may be calculated based on the live risk score alone, or based on the live risk score and any words spoken or sung during the media program, or any acoustic features or user features.

At box 482, an action is selected based on the risk of violation determined at box 480. In some instances, it may be determined that the media program poses no risk (or a minimal risk) of violating any rules. In such instances, an action need not be selected, or any selected action may simply permit the media program to continue unhindered or without any further intervention.

In some other instances, however, it may be determined that the media program poses a non-zero risk of violating one or more rules. In such instances, an action that is commensurate with a level of risk, such as to permit the media program to continue, or to inform one or more human personnel or other individuals of the level of risk, may be selected. In some implementations, the action to be selected may be based not only on the level of risk determined at box 480 but also a history of any prior violations of rules associated with the media program, the creator, or any listeners or other participants. For example, where a live risk score determined for a first media program having an extensive history of violations (e.g., by its creator or one or more participants) equals a live risk score determined for a second media program having a limited or no prior history of violations, an action selected for the first media program may be stricter or more extensive or intense than an action selected for the second media program. Alternatively, or additionally, the action may be selected on any basis in addition to the score calculated at box 455.

At box 484, identifiers of the risk of violation determined at box 480, the action selected at box 482 and the live risk score calculated at box 455 are stored in one or more data stores. Alternatively, or additionally, a time at which the violation occurred or was detected, or one or more portions of media content being played at the time, may be identified and stored in one or more data stores.

At box 490, the action selected at box 470 or box 482 is executed in accordance with the media program. At box 495, whether the media program is complete is determined. If the media program is not complete, then the process returns to box 425, where media content continues to be received by the control system from various sources and transmitted to the device of the creator and the devices of the listener for playing in accordance with the media program. Subsequently, any live media scores that were previously calculated at box 455 may be considered as an input to the model at box 450. If the media program is complete, however, then the process ends.

Referring to FIGS. 5A through 5E, views of aspects of one system for moderating content in accordance with embodiments of the present disclosure are shown. Except where otherwise noted, reference numerals preceded by the number "5" shown in FIGS. 5A through 5E indicate components or features that are similar to components or features having reference numerals preceded by the number "3" shown in FIG. 3, by the number "2" shown in FIG. 2A or FIG. 2B or by the number "1" shown in FIGS. 1A through 1L.

Figure 5A:
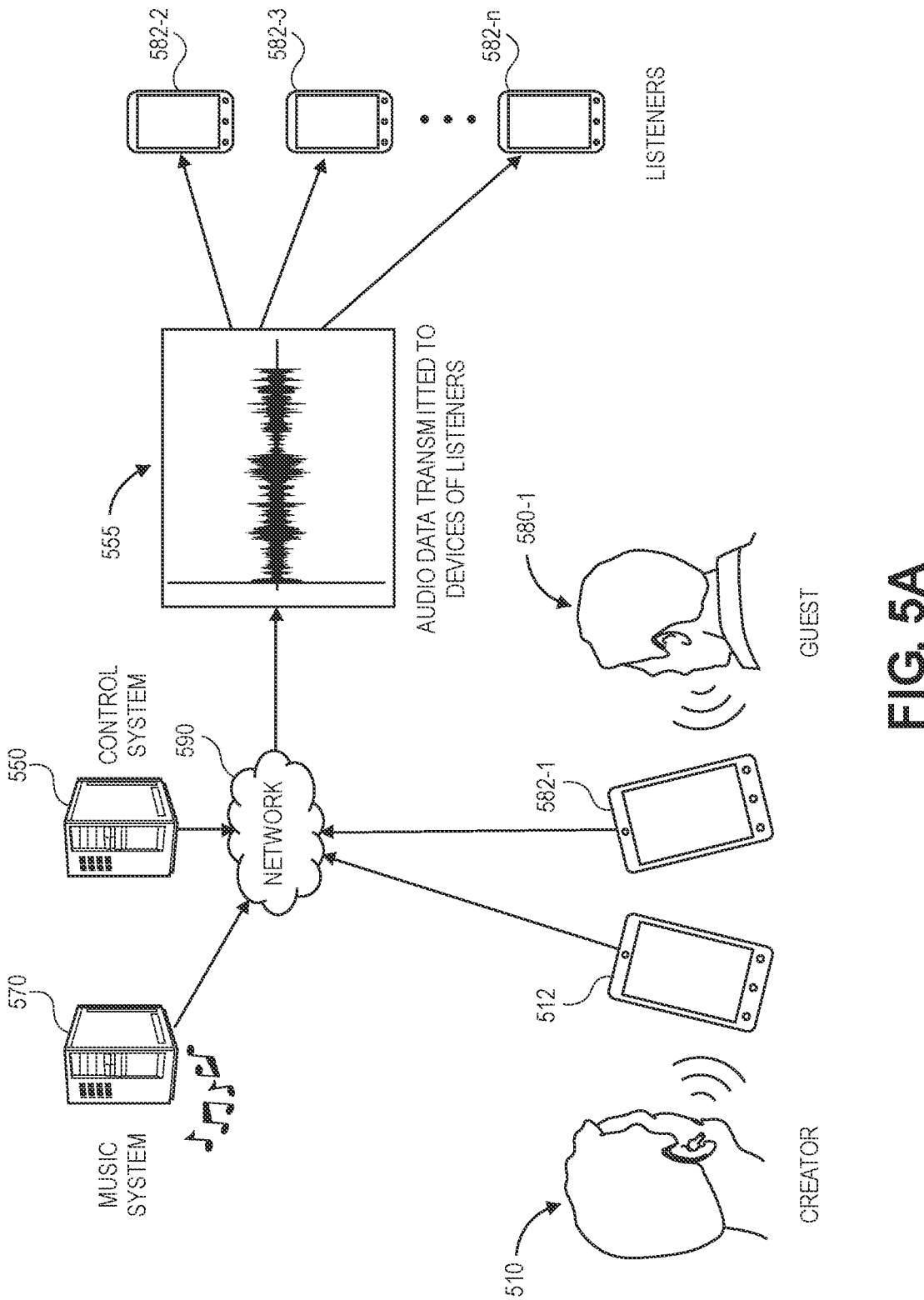
FIGS. 5A through 5E are views of aspects of one system for moderating content in accordance with embodiments of the present disclosure.

As is shown in FIG. 5A, a control system 550 transmits audio data 555 to a plurality of devices 582-1, 582-2, 582-3 . . . 582-*n* of listeners to a media program. The audio data 555 may be stored on or received from any number of sources. For example, at least some of the audio data 555 transmitted by the control system 550 may have been received from a device 512 of a creator 510, as well as the device 582-1 of a guest 580-1 (e.g., a listener), each of which may capture audio data representing one or more utterances that are spoken or sung by the creator 510 or the guest 580-1, respectively. At least some of the audio data may represent a media entity, e.g., music, that may have been retrieved from a music source 570. Alternatively, or additionally, the audio data 555 may include or represent any other audio signals obtained from any other source or in any other manner, and at any time.

Figure 5B:
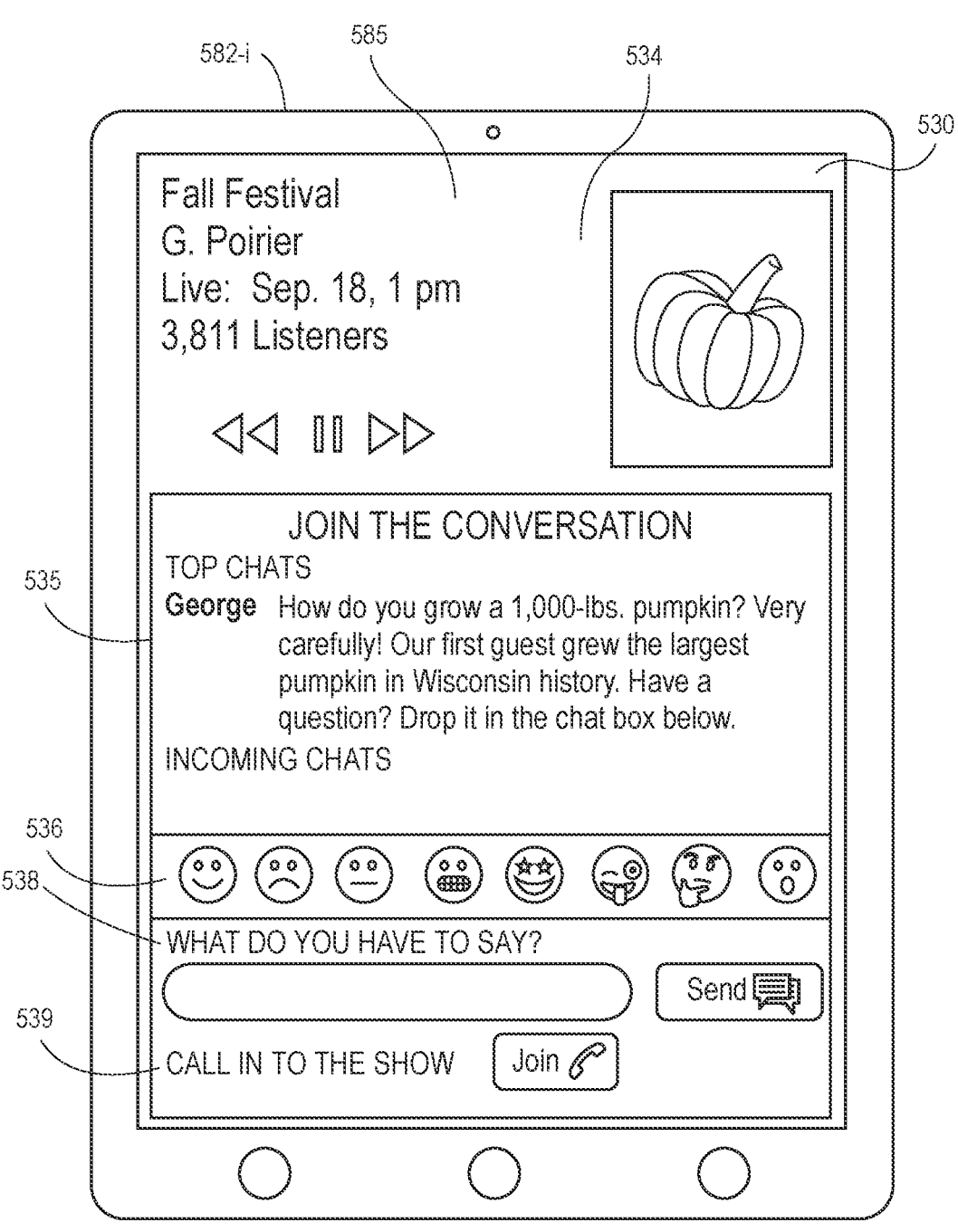

Additionally, users who receive media content of a media program, e.g., the audio data 555 shown in FIG. 5A, may provide interactions or other feedback during the playing of the media content. As is shown in FIG. 5B, a representative device 582-*i* of the plurality of devices 582-1, 582-2, 582-3 . . . 582-*n* of FIG. 5A is shown. The device 582-*i* of FIG. 5B includes a user interface 530 rendered on a display 585. Although the representative device 582-*i* is shown as a a tablet computer, a smartphone, or another mobile device, the computer systems or devices that may be operated or utilized in accordance with the present disclosure may be of any type or form, e.g., a portion of an automobile, a desktop computer, a media player, a smart speaker, a television, or a wristwatch, or any other like machine, and are not limited to mobile devices.

The user interface 530 includes a plurality of sections 534, 535, 536, 538, 539 for displaying information or data to a user of the device 582-*i*, or receiving interactions from the user of the device 582-*i*. For example, the section 534 of the user interface 530 is provided at an upper edge or area of the display 585, and includes one or more identifiers or information regarding the media program, including but not limited to a title of the media program, and a name of the creator 510 of the media program. The section 534 further includes a date and time of the media program, along with an indicator that the media program is being aired live, as well as a number of listeners to the media program (e.g., subscribers or other guests who have requested to receive one or more episodes of the media program), and features for rewinding, pausing or advancing media content during the media program. Alternatively, or additionally, the section 534 may include a description of any media content being played in accordance with the media program, viz., an interview between the creator 510 and the listener 580-1, as well as a rating of the media program (e.g., a qualitative or quantitative rating that may visually express a quality of the media program as rated by listeners in numbers, stars or other visual features), or any other information regarding the media program or the creator 510.

The section 535 is provided in a substantially central area of the display 585 below the section 534, and includes portions for displaying highly ranked or relevant chat messages (viz., "Top Chats") received from the creator 510 or any listeners, as well as any number of other chat messages (viz., "Incoming Chats") received from the creator 510 or other listeners. For example, as is shown in FIG. 5B, the section 535 includes a chat message received from the creator 510, viz., "George," that references the theme of the media content currently being played in accordance with the media program, and states, "How do you grow a 1,000-lbs.

pumpkin? Very carefully! Our first guest grew the largest pumpkin in Wisconsin history. Have a question? Drop it in the chat box below."

The section 536 is provided between the section 535 and the section 538, and includes a plurality of interactive features for expressing opinions or emotions regarding the media program in general, or a portion of the media program in particular, by one or more interactions with the user interface 530. For example, as is shown in FIG. 5B, each of the interactive features is an "emoji" or a digital icon, image or symbol representative of an emotion or an opinion, and may be selected in association with the media program or any portion of the media program in order to associate the representative emotion or opinion with the media program or portion thereof. One of the interactive features in the section 536 is a smiling face, and may be selected to express a generally pleasant, cheery or humorous emotion or opinion with the media program or a portion thereof, while another of the interactive features in the section 536 is a frowning face, and may be selected to express a generally concerned, disappointed or sad emotion or opinion with the media program or a portion thereof.

One of the interactive features in the section 536 is a face with a closed and substantially horizontally aligned mouth, and may be selected to express a mildly concerned, disappointed or sad emotion or opinion, or an emotion or opinion that is neutral (e.g., neither positive nor negative), regarding the media program or a portion thereof, while another of the interactive features in the section 536 is a face having a full-toothed grin, which may be selected to express a radiant or glowing emotion or opinion, e.g., an outwardly positive emotion or opinion, with the media program or a portion thereof. Likewise, one of the interactive features in the section 536 is a face with a broad, open smile, and with stars in lieu of eyes, which may be selected in order to express an emotion or opinion of amazement, fascination or excitement with the media program or a portion thereof, while yet another of the interactive features in the section 536 is a face with raised or furrowed eyebrows and a single monocle over one of the eyes, which may be selected in order to imply that the media program or a portion thereof may be worthy of further evaluation or consideration. Another of the interactive features is a face with raised or furrowed eyebrows and portions of a hand, such as a thumb and index finger, contacting the chin or a cheek of the face, which may be selected to express an emotion or opinion of inspection or skepticism regarding the media program or a portion thereof, while yet another of the interactive features is a face having an open or agape mouth, which may be selected in order to express an emotion or opinion of awe, disbelief, shock or surprise with the media program or a portion thereof.

The section 538 is provided between the section 536 and the section 539, and includes a text box or a like feature that enables a user of the device 582-*i* to provide a chat message to the creator 510 or other users, e.g., by executing one or more gestures or other interactions with a virtual keyboard rendered on the display 585, and a button or another selectable feature for transmitting the chat message provided within the text box to the control system 550 or the creator 510. Alternatively, a listener may provide a chat message or other information to the device 582-*i* for transmission to the creator 510 or the control system 550 in any other manner, e.g., by one or more voice commands or utterances, or by gestures or interactions with a drop-down menu.

The section 539 is provided at a lower edge or area of the display 585, and includes a button or another selectable feature for establishing a communications channel (e.g., a two-way communications channel) between the device 582-*i* and the control system 550 or any other system. Once the communication channel is established between the device 582-*i* and the control system 550 (or another system), a user operating the device 582-*i* may participate in the media program, such as by providing one or more spoken utterances via the device 582-*i*.

The user interface 530 may be rendered by the device 582-*i* in any manner. For example, code for rendering the user interface 530 may be transmitted to the device 582-*i* by the control system 550 or from any other source, and the device 582-*i* may render the user interface 530 and any of the sections 534, 535, 536, 538, 539 within the user interface 530 or on the display 585 accordingly. The code may be programmed in HTML or any other language, e.g., Java or JavaScript, and may be executed by a widget, an application programming interface (or "API"), or any other application or feature of the device 582-*i*. Moreover, the user interface 530 may include the features of the sections 534, 535, 536, 538, 539 in any locations on the user interface 530, and may be aligned in any orientation (e.g., portrait or landscape) with respect to the display 585. Moreover, a device operated or used by the creator 510 may render one or more user interfaces that include the same or similar features of the user interface 530 shown in FIG. 5B, or different features, that enable the creator 510 to provide one or more interactions during the playing of media content in accordance with the media program.

Figure 5C:
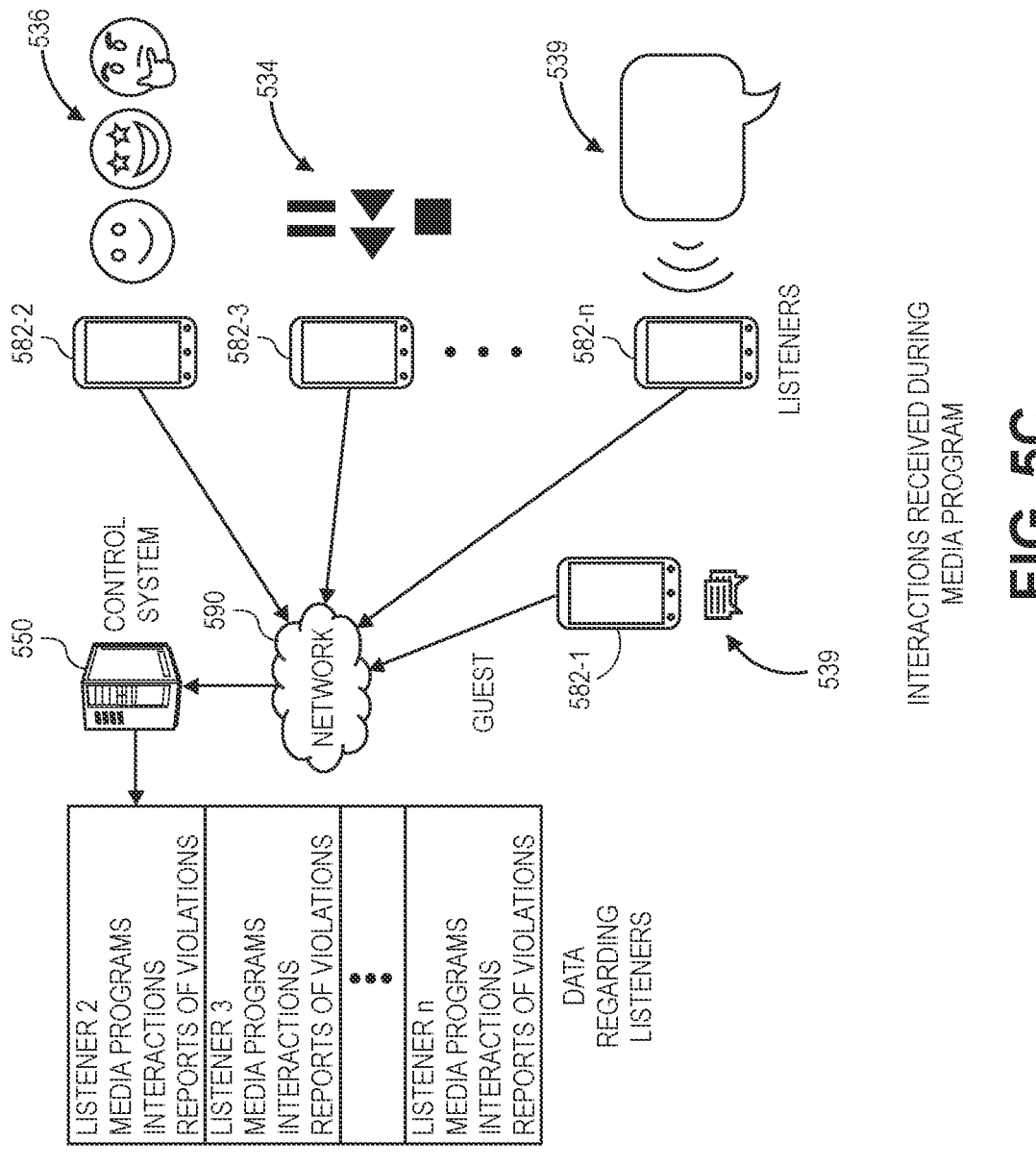

As is shown in FIG. 5C, the control system 550 may receive any number of interactions of any type or form from the device 512 of the creator 510 or any of the devices 582-1, 582-2, 582-3 . . . 582-*n* during the playing of the media program by such devices. For example, the control system 550 may receive interactions 536 with any of the emoji or other interactive features in the section 536 shown in FIG. 5B, as well as one or more interactions 534 for playing, pausing, stopping, advancing or rewinding media content by the user, chat messages received from the user, voice samples received from the user, expressions of emotions by the user (e.g., by selections of emojis associated with such emotions, or in any other manner), as well as chat messages 538 or voice samples 539 (e.g., audio data representing spoken or sung words) from users.

As is also shown in FIG. 5C, the control system 550 may identify information or data regarding listeners to the media program, e.g., histories of media programs previously listened to by such listeners, as well as any interactions received from the listeners during such media programs, and whether any of such interactions included a report of violations of one or more rules. Alternatively, or additionally, the control system 550 may also identify or retrieve any metadata regarding the media program, e.g., viewer ratings for maturity or other designated content, as well as any sentiments or other acoustic features that have been previously identified or extracted from media content of the media program.

Figure 5D:
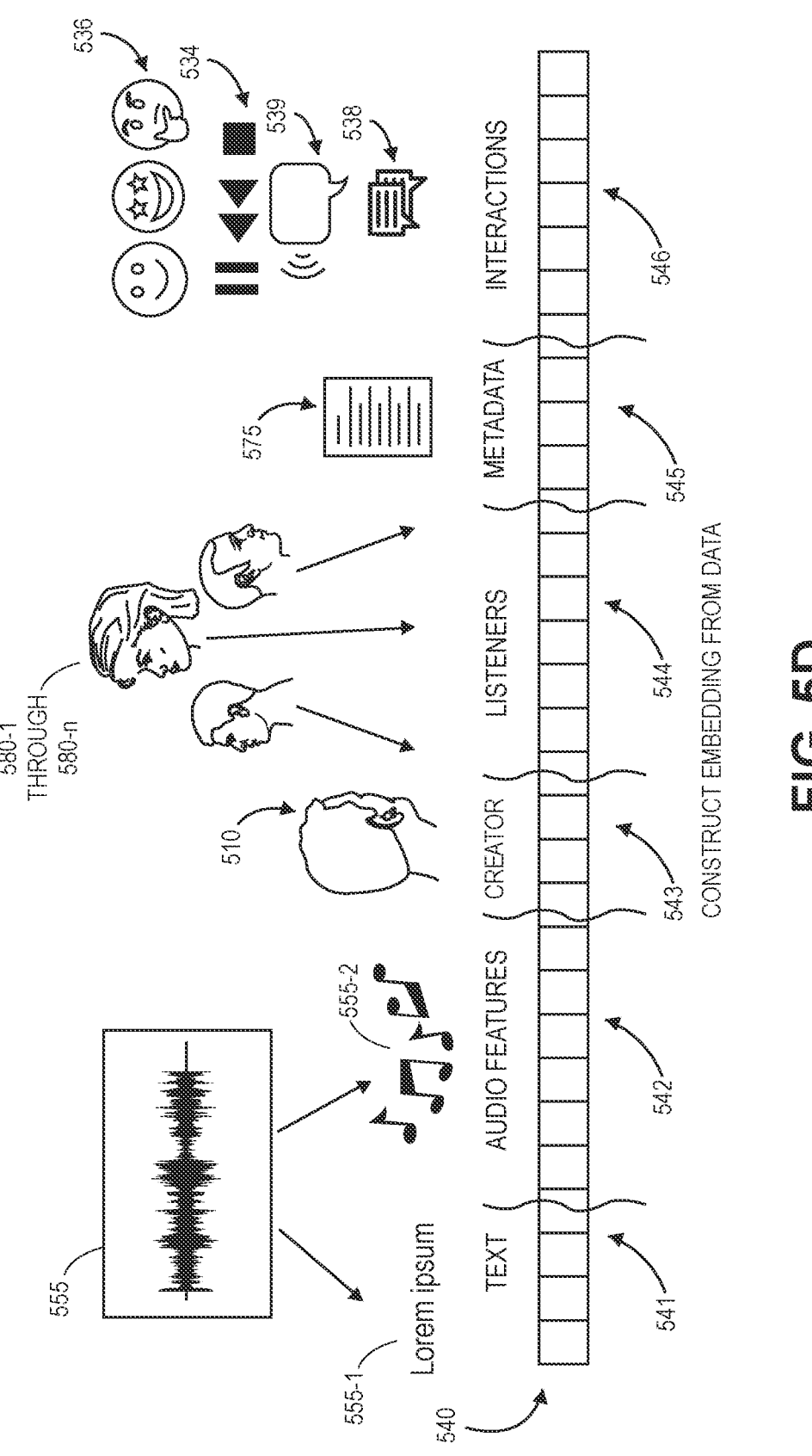

As is shown in FIG. 5D, an embedding (or a vector) 540 is constructed based on the audio data 555, the data regarding the listeners 580-1 through 580-*n* and the interactions 536, 534, 539, 538 received from listeners during the media program. The embedding (or vector) 540 is representative of the media content of the media program and includes data 541 representative of text 555-1 expressed in the audio data 555 and data 542 representative of audio features 555-2 not corresponding to the text 555-1, e.g., sentiments, topics, attitudes, intentions, urgencies, emotions, or other features representative of the audio data 555. The embedding 540 further includes data 543 representative of the creator 510, e.g., any information or data regarding a history of the creator 510, including but not limited to a history of any prior violations of rules associated with the media program, the creator, or any listeners or other participants.

The embedding (or vector) 540 also includes data 544 representative of the listeners 580-1 through 580-*n*, e.g., any information or data regarding media programs previously listened to by such listeners, as well as any interactions received from such listeners during such media programs, and whether such interactions included reports of violations of any rules, or whether such reports were confirmed or determined to be valid or invalid, such as any scores or other metrics assigned to each of such reports. The embedding (or vector 540) also includes data 545 representative of metadata 575 regarding the media program (e.g., viewer ratings for maturity or other designated content, sentiments or other acoustic features, or others). The embedding (or vector) 540 further includes data 546 representing the interactions 536, 534, 539, 538 received during the media program, as shown in FIG. 5C.

The embedding 540 may have any length or number of bits. In some implementations, the audio data 555 may be processed prior to generating the embedding 540, e.g., to identify and separate portions of the audio data 555 corresponding to audio signals including words and portions of the audio data 555 corresponding to audio signals not including words, prior to identifying the text 555-1 (e.g., based on the words) and the audio features 555-2 (e.g., based on the portions of the audio data 555 not including words) therefrom.

Figure 5E:
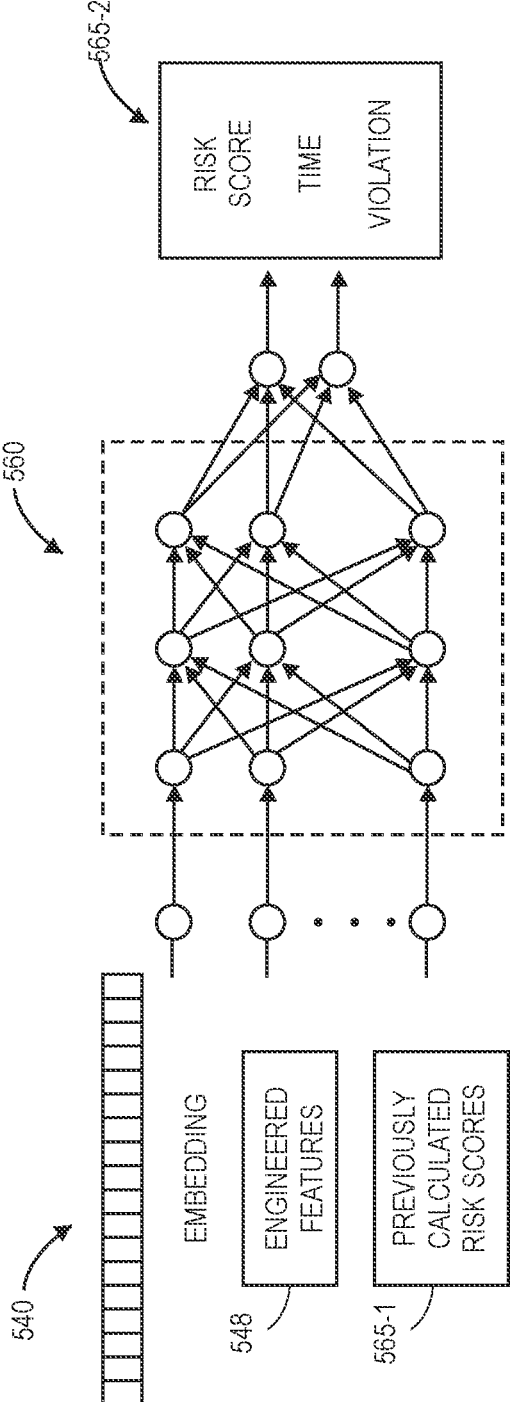

As is shown in FIG. 5E, once the embedding 540 has been constructed, the embedding 540 is provided along with one or more engineered features 548 and any previously calculated risk scores 565-1 as inputs to a model 560 that is trained to generate one or more outputs 565-2 representative of a level of risk (e.g., a risk score) that the media program has violated, is violating, or may violate one or more rules, as well as a time or a portion of the media program associated with the violation (or potential violation), and an identifier of the violation (or potential violation). The engineered features 548 may include any number of features or other information or data that need not be provided to the model 560 in an embedding, a vector or another representation or classification. For example, one or more of the engineered features 548 may include information or data regarding the creator, the media program, or listeners to the media program, such as a number of listeners, a number of interactions received from such listeners (or types or categories of such interactions), a number of violations previously observed during episodes of the media program, a number of reports of violations received from listeners, or any other data, which may be transformed into numeric features and may but need not be converted to or represented in an embedding. Additionally, the risk scores 565-1 may have been calculated on any basis, such as based on any outputs previously received from the model 560, either during or prior to the media program.

In some implementations, the model 560 may be an artificial neural network having an input layer, an output layer and any number of hidden layers trained to calculate the level of risk, or to identify the time or the violation based on text represented in media content, audio features derived from the media content, or user features derived from information or data regarding the creator 510, the listeners 580-1 through 580-*n*, or any other users. Alternatively, any other machine learning algorithm, system or technique may be used to calculate the level of risk, or to identify the time or the violation based on the embedding 540, the engineered features 548, or the previously calculated risk scores 565-1, in accordance with implementations of the present disclosure, such as deep learning systems, nearest neighbor methods or analyses; factorization methods or analyses; generative models; gradient boosted decision trees; K-means clustering analyses; Random Forest algorithms; support vector machines; similarity measures, or others.

Additionally, once the embedding 540 has been constructed, the embedding 540 may be utilized for any other purpose. Because the embedding 540 is a representation or classification of a portion of a media program at a given point in time, the embedding 540 may be stored in association with any user associated with the media program, e.g., the creator 510, or any of the listeners 580-1 through 580-*n*, and utilized in a manner consistent with any other information or data regarding the user. For example, the embedding 540, or any other embeddings calculated based on any other media programs associated with a user, may be used to identify one or more product recommendations for the user, as the embedding 540 may richly describe attributes of media programs in which the user is interested, or may identify or represent attributes of typical users who are interested in the media program, and such attributes may be used to identify other media programs or products of any type of form for the user, or for like users.

Figure 6A:
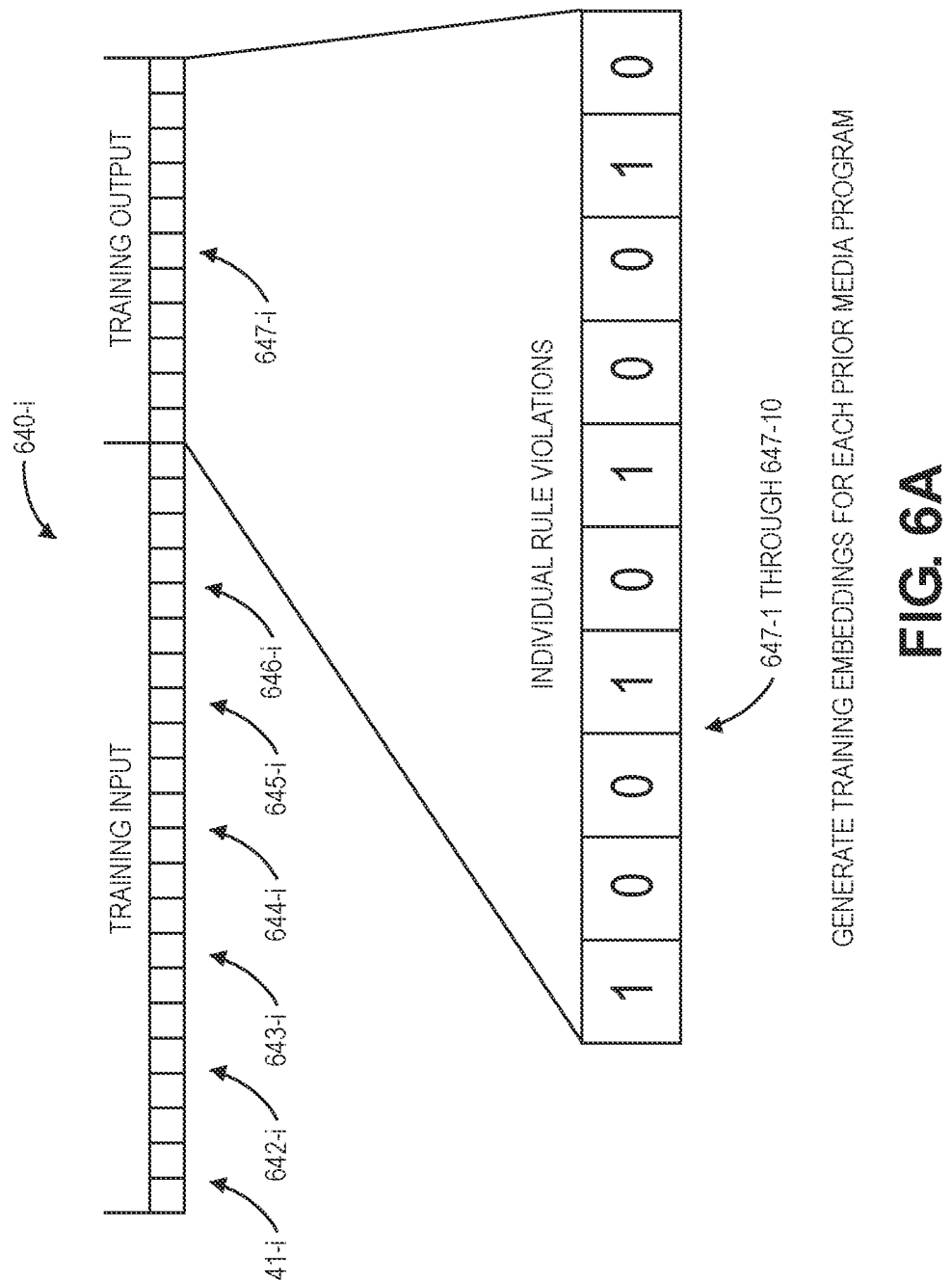
FIGS. 6A and 6B are views of aspects of one system for moderating content in accordance with embodiments of the present disclosure.
Figure 6B:
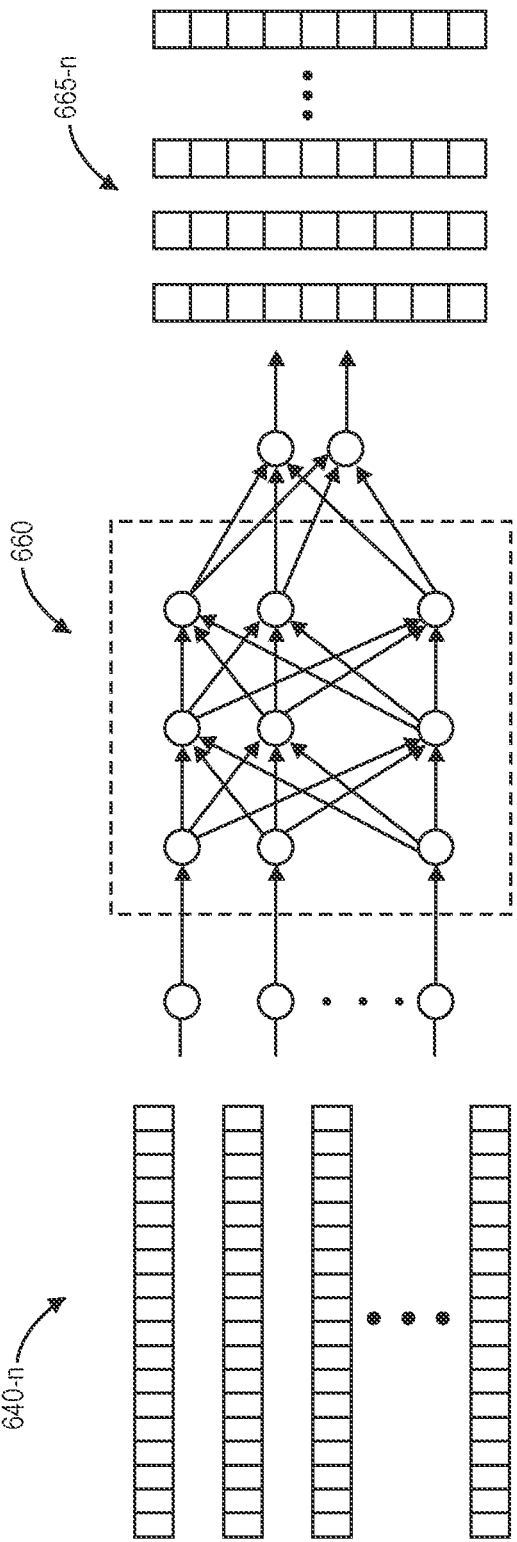

Models may be trained using training embeddings that include not only training inputs comprising values representing text expressed during media programs, audio features derived from media programs or user features associated with users of such media programs but also training outputs including values representing whether any violations were observed during such media programs. Referring to FIGS. 6A and 6B, views of aspects of one system for moderating content in accordance with embodiments of the present disclosure are shown. Except where otherwise noted, reference numerals preceded by the number "6" shown in FIG. 6A or 6B indicate components or features that are similar to components or features having reference numerals preceded by the number "5" shown in FIGS. 5A through 5E, by the number "3" shown in FIG. 3, by the number "2" shown in FIG. 2A or FIG. 2B or by the number "1" shown in FIGS. 1A through 1L.

As is shown in FIG. 6A, a training embedding 640-*i* includes a set of training inputs and a set of training outputs 647-*i*. The training inputs include data 641-*i* representative of text expressed in audio data of a media program, along with data 642-*i* representative of audio features derived from portions of the audio data not corresponding to the text, data 643-*i* regarding the creator of the media program, data 644-*i* regarding listeners to the media program, data 645-*i* regarding metadata associated with the media program, and data 646-*i* regarding interactions received from users during the media program. The data 641-*i*, 642-*i*, 643-*i*, 644-*i*, 645-*i*, 646-*i* may have any of the same attributes, or any different attributes, of the data 541, 542, 543, 544, 545, 546 described above with respect to FIGS. 5D and 5E, and may be derived or identified in a similar manner, or in any other manner.

The training outputs 647-*i* include a set of values 647-1 through 647-10 indicating whether any violations were observed during the media program with which the data 641-*i*, 642-*i*, 643-*i*, 644-*i*, 645-*i*, 646-*i* is associated. For example, as is shown in FIG. 6A, each of the set of values may indicate whether any of a set of discrete, individual rules was violated during the media program. In some implementations, each of the values 647-1 through 647-10 may be zero or one, with a value of zero indicating that no violations of a specific one of the rules were observed during the media program and a value of one indicating that at least one violation of the specific one of the rules was observed during the media program. Alternatively, or additionally, the set of values 647-1 through 647-10 may further include a single value of zero or one, with a value of zero indicating that no violations of any of the rules were observed during the media program and one indicating that at least one violation of at least one of the rules was observed during the media program.

As is shown in FIG. 6B, a model 660 may be trained to recognize a risk of violations using a set of training embeddings 640-*n*, each of which may have been generated for a specific media program, and may have the characteristics of the training embedding 640-*i* of FIG. 6A. For example, where the model 660 is an artificial neural network having an input layer, an output layer and any number of hidden layers, each of the neurons in a layer within the model 660 may receive an input and generate an output in accordance with an activation or energy function, with parameters corresponding to the various strengths or synaptic weights. For example, where the model 660 is a heterogeneous neural network, each of the neurons within the network may be understood to have different activation or energy functions. In some neural networks, at least one of the activation or energy functions may take the form of a sigmoid function, wherein an output thereof may have a range of zero to one, or 0 to 1. In other neural networks, at least one of the activation or energy functions may take the form of a hyperbolic tangent function, wherein an output thereof may have a range of negative one to positive one, or −1 to +1. The model 660 may utilize any other activation or energy function in accordance with implementations of the present disclosure, including but not limited to binary step functions, linear functions, or non-linear functions, e.g., logistic functions, rectified linear unit functions, softmax functions, or others. Thus, the training of the model 660 may result in the redefinition or adjustment of the strengths or weights of such connections between neurons in the various layers of the neural network, in order to provide an output that most closely approximates or associates with the input to the maximum practicable extent.

For example, where providing the set of training embeddings 640-*n* to the model 660 produces a set of outputs 665-*n*, each of the outputs 665-*n* may be compared to a corresponding training output 647-*i* of one of the training embeddings 640-*n* to determine how well the outputs 665-*n* most closely approximate or associate with the corresponding training output 647-*i*. In some implementations, a set of validation embeddings or a set of test embeddings may be identified or partitioned or otherwise set aside from the set of training embeddings 640-*n*, with the set of training embeddings being used to train the model 660, and the set of test embeddings and the set of validation embeddings being used to test or validate, respectively, the model 660 during or after training.

Figure 7:
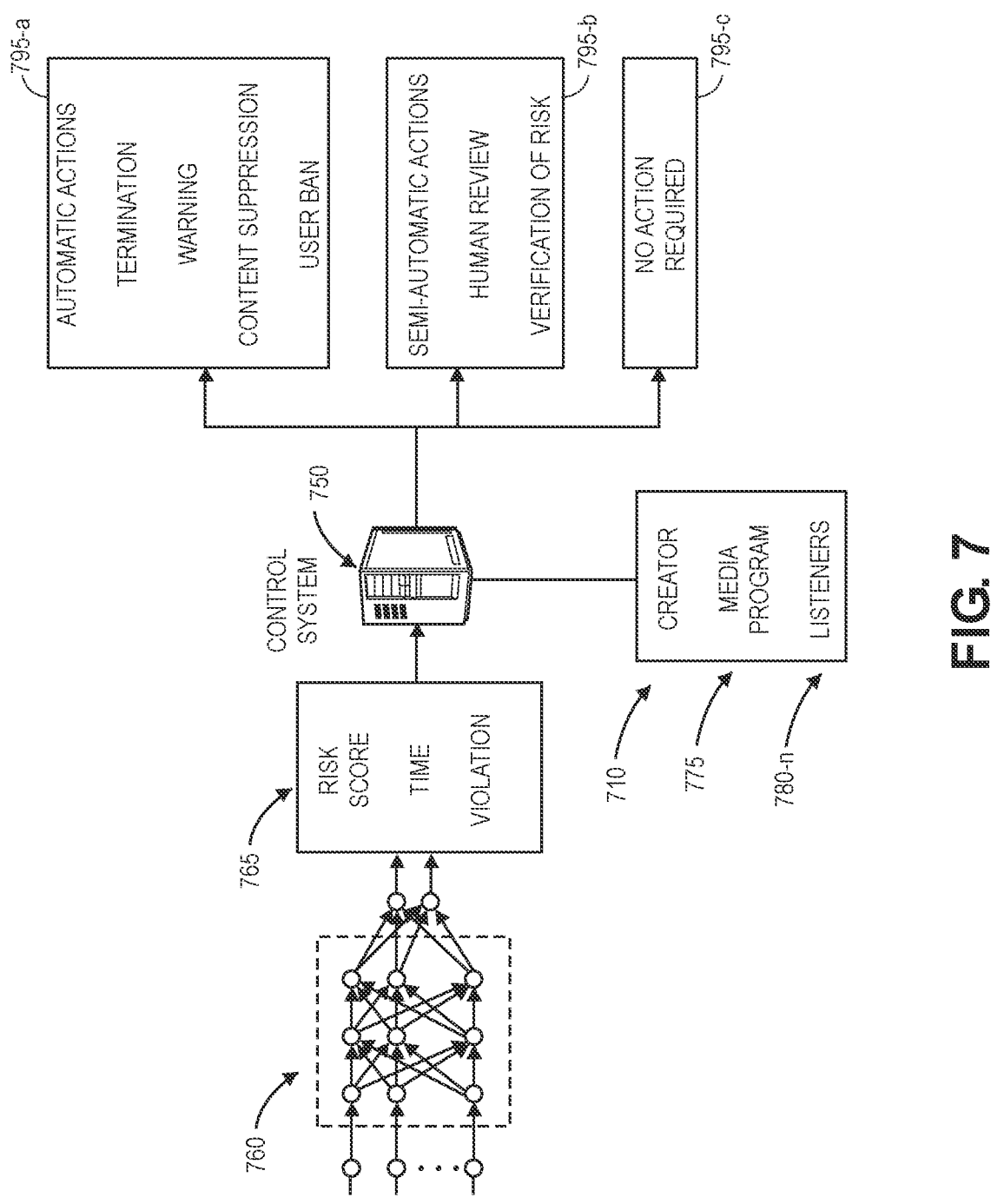
FIG. 7 is a view of aspects of one system for moderating content in accordance with embodiments of the present disclosure.

Actions to be taken upon determining that a violation is occurring or may have occurred, or that a risk of a violation is sufficiently high, may be identified or recommended based on one or more outputs received from a model. Referring to FIG. 7, aspects of one system for moderating content in accordance with embodiments of the present disclosure are shown. Except where otherwise noted, reference numerals preceded by the number "7" shown in FIG. 7 indicate components or features that are similar to components or features having reference numerals preceded by the number "6" shown in FIG. 6A or 6B, by the number "5" shown in FIGS. 5A through 5E, by the number "3" shown in FIG. 3, by the number "2" shown in FIG. 2A or FIG. 2B or by the number "1" shown in FIGS. 1A through 1L.

As is shown in FIG. 7, a model 760 generates outputs 765 from which a risk score (or a probability or likelihood) that one or more rules are being, have been or may be violated is calculated, along with a time (or a portion) of a media program associated with the violation or potential violation, and an identifier of the one or more rules. A control system 750 processes the outputs 765 and any information or data that may be available regarding a creator 710 of the media program, audio signals 775 transmitted in accordance with the media program, or listeners 780-n to the media program, to identify or select an action to be executed or recommended based on such outputs 765. For example, in some implementations, the control system 750 may identify a set of actions 795-a that may be automatically executed by the control system 750 during the media program in response to the outputs 765. The set of actions 795-a may include, but need not be limited to, terminating the media program, issuing a warning to one or more users, suppressing media content of a specific type or category, banning one or more users, or any other action consistent or commensurate with a violation of any rules, or a risk that any of the rules may be violated, as determined based on the outputs 765.

Alternatively, or additionally, the control system 750 may identify or generate a set of actions 795-b that may be recommended to one or more human actors, which may include the creator 710 or any other staff or personnel associated with the control system 750. The set of actions 795-b may include forwarding information or data regarding the media program, e.g., the outputs 765, or the information or data regarding the creator 710, the audio signals 775, or the listeners 780-n, to a human actor for a review, or for a verification of a level of risk (e.g., a risk score) determined thereby. Alternatively, or additionally, the set of actions 795-b may also include any of the set of actions 795-a, or any other actions. A human actor may review any recommendations of such actions, along with information or data generated based on the outputs 765, and determine whether to execute any or all of the recommended set of actions 795-b.

Alternatively, or additionally, the control system 750 may make a determination 795-c, based on the outputs 765, or the information or data regarding the creator 710, the audio signals 775, or the listeners 780-n, that no actions are required. For example, the control system 750 may determine that a risk score calculated based on the outputs 765 is sufficiently low, or that histories of the creator 710 or the listeners 780-n suggest that any violations were inadvertent or not worthy of any further response. Alternatively, where the media program has concluded, the control system 750 may determine that no additional actions are necessary or that any additional actions would be ineffective.

Figure 8:
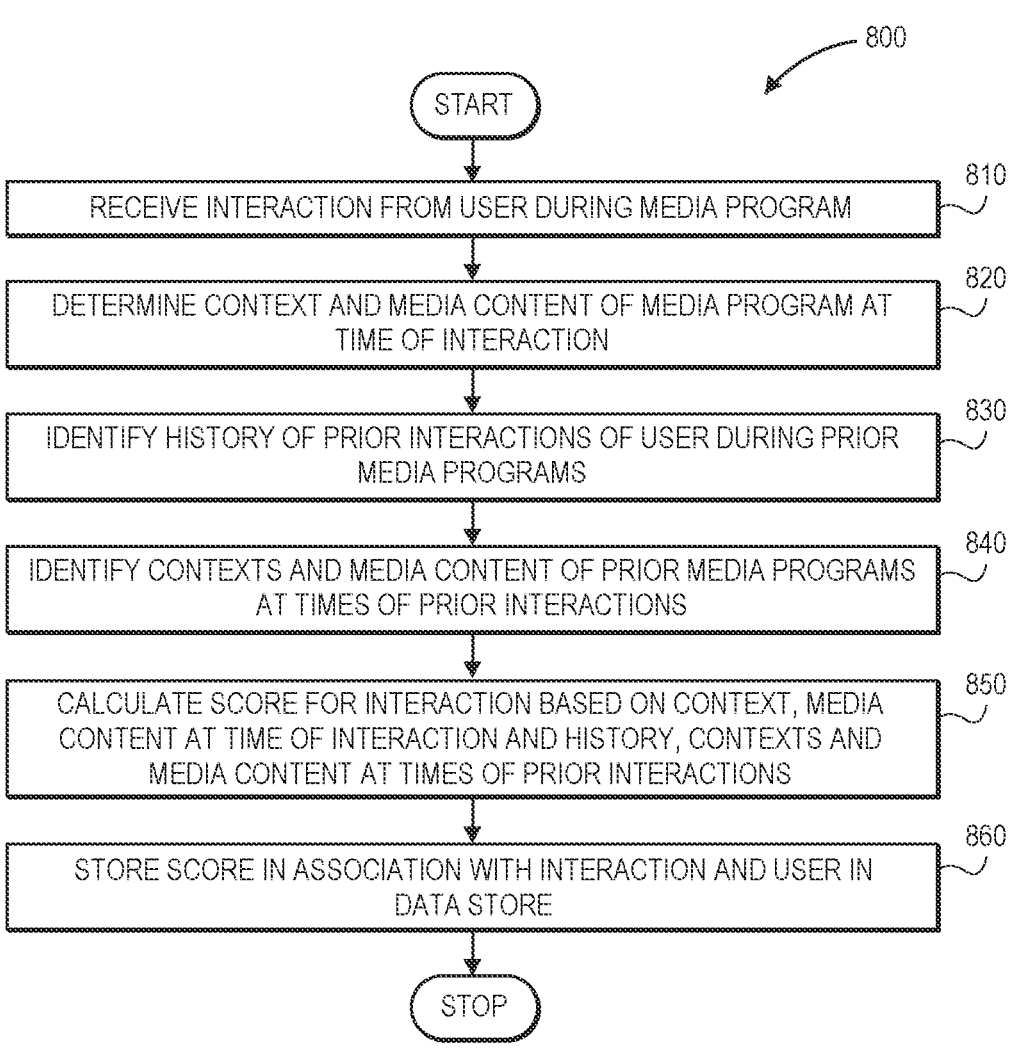
FIG. 8 is a flow chart of one process for moderating content in accordance with embodiments of the present disclosure.

Referring to FIG. 8, a flow chart 800 of one process for moderating content in accordance with embodiments of the present disclosure is shown.

At box 810, an interaction is received from a user during a media program. The user may be a creator of the media program, a listener to the media program, a guest or another participant in the media program, or any other entity associated with the media program. The interaction may take any form. In some implementations, the interaction may include but need not be limited to actions for causing a playing, pausing, stopping, advancing or rewinding of media content by the user, chat messages received from the user, voice samples received from the user, expressions of emotions by the user (e.g., by selections of emojis associated with such emotions, or in any other manner), or any other interactions.

At box 820, a context of the media program at a time at which the interaction was received, and media content being played at the time, are determined. For example, the context may be defined with respect to a number or identities of listeners or participants in the media program at or prior to the time, a period of time that had elapsed during the media program prior to the time of the interaction, or any media content that was playing at or prior to the time, e.g., audio data representing advertisements, music, news, sports, weather, or other programming, as well as words that are spoken or sung by a creator, a guest, a listener, or any participant in the media program. The context may also identify any sentiments, topics, attitudes, intentions, urgencies, emotions, or others of the media program in general, or of the media content in particular.

At box 830, a history of prior interactions of the user during prior media programs is identified. For example, the history may include a record of information or data identifying a number of the prior interactions received from the user, as well as identifiers of the media programs during which the prior interactions were received. The history may also identify information or data regarding types or forms of such prior interactions. For example, the history may include a record of text included in any chat messages received in accordance with such interactions, as well as audio signals (or a record of words transcribed from such audio signals) received in accordance with such interactions, or any other identifiers of such interactions. Moreover, the history may also identify whether such interactions include reports of violations of any rules during such media programs, such as identifiers of a creator, a listener, or a participant that allegedly violated any rules, or identifiers of any rules that were allegedly violated, as well as information or data detailing any such alleged violations.

At box 840, contexts and media content of the prior media programs being aired at times at which the prior interactions were received are determined. The context and the media content may include, but need not be limited to, the same or similar information or data as the context and the media content determined at box 820 regarding the media program, or other information or data.

At box 850, a score is calculated for the interaction based on the context and the media content at the time of the interaction and the history, the contexts and the media content at the times of prior interactions. The score may represent a level of confidence in the interaction, as well as its relevance to the media program, or the media content being played at the time.

At box 860, the score is stored in association with the interaction and the user in the data store, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4A and 4B or 8, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system, comprising:

at least one computer processor; and at least one data store including one or more sets of instructions stored thereon that, when executed by the at least one computer processor, cause the first computer system to perform actions comprising:

receiving media content from at least one of:

a second computer system associated with a creator of a media program; or a third computer system associated with a media source;

causing the media content to be transmitted to at least a fourth computer system associated with a listener in accordance with a first media program;

processing the media content to identify a first portion of the media content corresponding to words and a second portion of the media content not corresponding to the words;

recognizing at least one of the words within the first portion of the media content using at least a first machine learning model;

generating an audio feature based at least in part on the second portion of the media content using at least the first machine learning model;

determining information regarding the first media program, wherein the information regarding the first media program comprises at least one of:

a text-based description of the first media program;

a rating of the first media program;

an acoustic feature of the first media program;

an identifier of at least one of the plurality of listeners to the first media program; or an image associated with the first media program;

generating an embedding based at least in part on:

the at least one of the words;

the audio feature; and the information regarding the first media program;

providing the embedding to at least a second machine learning model as an input;

receiving an output from the second machine learning model in response to the input;

calculating a score representative of a risk that the first media program has violated at least one rule based at least in part on the output; and terminating, based at least in part on the score and prior to completion of playback of the first media program, further transmission, by at least the first computing device, of the media content from the second computer system associated with the creator.

2. The first computer system of claim 1, wherein the at least one rule is a restriction on a selected type or category of content.

3. The first computer system of claim 1, further comprising:

creating a task for at least one human actor to evaluate at least one of the creator or the first media program based at least in part on the score.

4. A computer-implemented method comprising:

under control of at least a first computer system configured with executable instructions, receiving, by at least the first computer system from a second computer system, first data representing first media content of a first media program, wherein the second computer system is associated with a creator of the first media program;

transmitting, by at least the first computer system, second data to at least a third computer system, wherein the second data comprises at least some of the first data, and wherein the third computer system is associated with one of a plurality of listeners to the first media program;

receiving, by at least the first computer system from the third computer system, information representing at least one interaction with the third computer system by the one of the plurality of listeners during a playing of at least the first media content by the third computer system;

identifying, by at least the first computer system, a first portion of the second data representing a set of words spoken by at least one participant during the first media program;

determining, by at least the first computer system, a first feature based at least in part on a second portion of the second data;

determining, by at least the first computer system, a second feature based at least in part on the information representing the at least one interaction;

providing, by at least the first computer system, information regarding at least the set of words, the first feature and the second feature to a first machine learning model as a first input;

identifying, by at least the first computer system, a first output generated by the first machine learning model in response to the first input;

determining, by at least the first computer system, a first level of risk that at least one rule associated with the first media program has been violated based at least in part on the first output; and terminating, based at least in part on the first level of risk and prior to completion of playback of the first media program, further transmission, by at least the first computer system, of the first data representing the first media content of the first media program to the third computer system.

5. The computer-implemented method of claim 4, wherein determining the first level of risk associated with the first media program based at least in part on the first output comprises:

calculating, by at least the first computer system, a first score representing a likelihood that the at least one rule associated with the first media program has been violated, wherein the indication of the first level of risk comprises the first score.

6. The computer-implemented method of claim 5, further comprising:

determining, by at least the first computer system, that the first score exceeds a predetermined threshold.

7. The computer-implemented method of claim 5, further comprising:

determining, by at least the first computer system that the first score does not exceed a predetermined threshold; and in response to determining that the score does not exceed the predetermined threshold, providing the warning message to the second computer system associated with the creator of the media program.

8. The computer-implemented method of claim 5, further comprising:

prior to transmitting the second data to at least the third computer system, determining, by at least the first computer system, information regarding the first media program, wherein the information regarding the first media program comprises:

a text-based description of the first media program;

a rating of the first media program;

an acoustic feature of the first media program;

an identifier of at least one of the plurality of listeners to the first media program; or an image associated with the first media program;

determining, by at least the first computer system, information regarding the creator, wherein the information regarding the creator comprises:

a history of violations of at least one rule associated with the creator; or feedback received from the at least one of the plurality of listeners to one of the first media program or a second media program associated with the creator, providing, by at least the first computer system, information regarding the first media program and the information regarding the creator to the first machine learning model as a second input;

identifying, by at least the first computer system, a second output generated by the first machine learning model in response to the second input;

determining, by at least the first computer system, a second level of risk that the at least one rule associated with the first media program has been violated based at least in part on the second output; and calculating, by at least the first computer system, a second score representing a likelihood that the at least one rule associated with the first media program will be violated, wherein the indication of the second level of risk comprises the second score, and wherein the first input further comprises the second score.

9. The computer-implemented method of claim 4, further comprising:

providing, by at least the first computer system, at least one of the first portion of the second data or the second portion of the second data to at least a second machine learning model as a second input;

identifying, by at least the first computer system, a second output generated by the second machine learning model in response to the second input; and identifying, by at least the first computer system, at least one of the set of words or the first feature based at least in part on the second output.

10. The computer-implemented method of claim 4, wherein the first machine learning model is one of:

an artificial neural network; or a bidirectional encoder representation from transformers.

11. The computer-implemented method of claim 4, further comprising:

determining, by at least the first computer system, information regarding at least one of the third computer system or the one of the plurality of listeners, wherein the information identifies at least one of:

a second media program to which the one of the plurality of listeners is a listener; and an interaction with the third computer system by the one of the plurality of listeners during the second media program; and calculating, by at least the first computer system, a score representative of a level of confidence in the at least one interaction, wherein the first input comprises the score.

12. The computer-implemented method of claim 4, wherein the at least one interaction is one of:

an action for playing, pausing, stopping, advancing or rewinding media content;

a chat message received from one of the plurality of listeners;

a voice sample received from one of the plurality of listeners; or an expression of at least one emotion of one of the plurality of listeners.

13. The computer-implemented method of claim 4, wherein the at least one rule is a content-based restriction.

14. The computer-implemented method of claim 4, wherein the first input is an embedding having a plurality of sets of values comprising:

a first set of values corresponding to at least some of the set of words;

a second set of values corresponding to the first feature; and a third set of values corresponding to the second feature.

15. The computer-implemented method of claim 4, further comprising:

prior to providing at least the set of words, the first feature and the second feature to the first machine learning model as the first input, training, by at least the first computer system, the first machine learning model based at least in part on a plurality of embeddings, wherein each of the plurality of embeddings represents a media program, and wherein each of the embeddings comprises:

a first set of values corresponding to at least some of a set of words spoken or sung during one of a plurality of media programs;

a second set of values corresponding to an audio feature derived based at least in part on media content of the one of the plurality of media programs;

a third set of values corresponding to a user feature derived based at least in part on information regarding a listener to the one of the plurality of media programs; and a fourth set of values indicating whether at least one rule was violated during the one of the plurality of media programs.

16. The computer-implemented method of claim 4, further comprising:

receiving, by at least the first computer system from a fourth computer system, fourth data representing at least one of:

an advertisement;

a media entity;

a news program;

a sports program; or a weather report, wherein the second data comprises at least some of the first data and at least some of the fourth data.

17. The computer-implemented method of claim 4, wherein the second computer system is at least one component of one of an automobile, a desktop computer, a laptop computer, a media player, a smartphone, a smart speaker, a tablet computer, a television, or a wristwatch.

18. A method comprising:

under control of one or more computing systems configured with executable instructions, determining, by at least a first computer system, information regarding a first media program, wherein the information regarding the first media program comprises:

a text-based description of the first media program;

a rating of the first media program;

an acoustic feature of the first media program;

an identifier of at least one of the plurality of listeners to the first media program; or an image associated with the first media program;

determining, by at least the first computer system, information regarding a creator associated with the first media program, wherein the information regarding the creator comprises:

a history of violations of at least one rule associated with the creator; or feedback received from the at least one of the plurality of listeners to one of the first media program or a second media program associated with the creator, providing, by at least the first computer system, information regarding the first media program and the information regarding the creator to a first machine learning model as a first input;

identifying, by at least the first computer system, a first output generated by the first machine learning model in response to the first input;

calculating, by at least the first computer system, a first score representing a likelihood that at least one rule associated with the first media program will be violated based at least in part on the first output;

transmitting, by at least the first computer system, first data to at least a second computer system associated with one of a plurality of listeners to the first media program, wherein the first data comprises media content in accordance with the first media program;

identifying, by at least the first computer system, a first portion of the first data representing a set of words spoken by at least one participant during the first media program;

determining, by at least the first computer system, a first feature based at least in part on a second portion of the first data;

providing, by at least the first computer system, information regarding at least the set of words, the first feature and the first score to the first machine learning model as a second input;

identifying, by at least the first computer system, a second output generated by the first machine learning model in response to the second input;

calculating, by at least the first computer system, a second score representing a likelihood that at least one rule associated with the first media program has been violated based at least in part on the second output; and terminating, based at least in part on the second score and prior to completion of playback of the first media program, further distribution by at least the first computing device of the first media program associated with the creator.

19. The method of claim 18, further comprising:

prior to transmitting the first data to at least the second computer system, providing, by at least the first computer system, at least the first portion of the first data to at least a second machine learning model as a third input;

identifying, by at least the first computer system, a third output generated by the second machine learning model in response to the third input; and identifying, by at least the first computer system, at least one of the set of words or the first feature based at least in part on the third output.

20. The method of claim 18, wherein the second input is an embedding having a plurality of sets of values comprising:

a first set of values corresponding to at least some of the set of words;

a second set of values corresponding to the first feature; and a third set of values corresponding to the first score.

* * * * *